United States Patent
Satpathy

(10) Patent No.: US 11,599,680 B2
(45) Date of Patent: Mar. 7, 2023

(54) ENCRYPTION AND DECRYPTION ENGINES WITH HYBRID MASKING TO PREVENT SIDE CHANNEL ATTACKS

(71) Applicant: Meta Platforms Technologies, LLC, Menlo Park, CA (US)

(72) Inventor: Sudhir Satpathy, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 567 days.

(21) Appl. No.: 16/721,701

(22) Filed: Dec. 19, 2019

(65) Prior Publication Data

US 2021/0150070 A1    May 20, 2021

Related U.S. Application Data

(60) Provisional application No. 62/938,067, filed on Nov. 20, 2019.

(51) Int. Cl.
*G06F 21/75* (2013.01)
*G06F 15/78* (2006.01)
(Continued)

(52) U.S. Cl.
CPC ........ *G06F 21/755* (2017.08); *G06F 15/7807* (2013.01); *G06T 19/006* (2013.01); *H04N 13/332* (2018.05)

(58) Field of Classification Search
CPC .. G06F 21/755; G06F 15/7807; G06F 21/602; G06T 19/006; H04N 13/332
See application file for complete search history.

(56) References Cited

U.S. PATENT DOCUMENTS

2007/0071236 A1* 3/2007 Kohnen ............... H04L 9/0631
  380/37
2012/0163585 A1* 6/2012 Choi ....................... H04L 9/002
  380/28

(Continued)

OTHER PUBLICATIONS

"Announcing the Advanced Encryption Standard (AES)," Federal Information Processing Standards Publication 197, Nov. 26, 2001, 51 pp.

(Continued)

*Primary Examiner* — Baotran N To
(74) *Attorney, Agent, or Firm* — Shumaker & Sieffert, P.A.

(57) ABSTRACT

A system on a chip (SoC) includes a security processor configured to form a Boolean mask, to form a shifted-row Boolean mask from the Boolean mask, and to add the shifted-row Boolean mask to cipher text to form Boolean-masked cipher text. The SoC includes a decryption engine configured to apply a shift rows operation to the Boolean-masked cipher text to form byte-aligned Boolean-masked cipher text, to apply a product of the Boolean mask and a multiplicative mask to the byte-aligned Boolean-masked cipher text to form multiplicatively masked cipher text, to perform an inverse byte substitution operation on the multiplicatively masked cipher text by applying a product of the Boolean mask and an inverse of the multiplicative mask to the multiplicatively masked cipher text to form Boolean-masked intermediate data, and to apply mix columns logic to the Boolean-masked intermediate data to form byte-shifted Boolean-masked output data.

20 Claims, 17 Drawing Sheets

(51) Int. Cl.
*G06T 19/00* (2011.01)
*H04N 13/332* (2018.01)

(56) References Cited

U.S. PATENT DOCUMENTS

| 2015/0222421 A1* | 8/2015 | Guo ........................ H04L 9/003 380/28 |
| 2018/0097618 A1* | 4/2018 | Kumar .................... H04L 9/003 |
| 2021/0157586 A1* | 5/2021 | Vigilant .................. H04L 9/003 |

OTHER PUBLICATIONS

"SMS4 Encryption Algorithm for Wireless Networks," Version 1.03, May 15, 2008, 6 pp. (translated by Diffie et al.).
Aoki et al., "Specification of Camellia—a 128-bit Block Cipher," NTT and Mitsubishi Electric Corporation, Sep. 26, 2001, 35 pp.
U.S. Appl. No. 16/506,618, filed Jul. 9, 2019, by Atlas et al.

* cited by examiner

ENCRYPTION AND DECRYPTION ENGINES WITH HYBRID MASKING TO PREVENT SIDE CHANNEL ATTACKS

This application claims the benefit of U.S. Provisional Patent Application No. 62/938,067 filed on 20 Nov. 2019, the entire contents of which are incorporated by reference herein.

TECHNICAL FIELD

This disclosure generally relates to data encryption and decryption implemented in various types of computing systems.

BACKGROUND

Many computing systems incorporate content protection or digital rights management technology that includes data encryption and decryption hardware and software. This encryption protects secure data, which is potentially sensitive, private, and/or right-managed and is stored or used on the system, from unauthorized access and exploitation. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g. wirelessly or in tethered fashion) to a peripheral device that performs one or more artificial reality-related functions.

SUMMARY

Some devices that perform encryption and/or decryption are standalone devices that are relatively portable and battery-powered. These features make these devices relatively vulnerable to attack or snooping mechanisms that rely on gleaning information about the hardware functioning of these devices. An example of such an attack mechanism is a so-called "side channel attack" or SCA. SCAs exploit one or more of timing information, current (flow of charge) information, power consumption data, electromagnetic traces and leaks, emitted sounds, etc. In some examples, devices that perform encryption and/or decryption are incorporated into artificial reality systems. Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. Some artificial reality systems incorporate a head-mounted display (HMD) and a peripheral device that are communicatively coupled and function as co-processing devices within the artificial reality system. The HMD is typically worn by a user and configured to output artificial reality content to the user. The peripheral device typically has a form factor similar to that of a handheld mobile computing device, such as a smartphone or personal digital assistant (PDA), and is held in the user's hand. Artificial reality content may represent completely generated content, or a combination of generated content with captured content (e.g., real-world video and/or images).

For portability and other reasons, user-facing artificial reality modalities (e.g., HMDs) and co-processing devices (e.g., peripheral devices in communication with HMDs) are battery-powered, and are therefore often designed for low-power operation. The low-power designs and portable form factors of HMDs and peripheral devices make these devices particularly vulnerable to SCAs, which are often performed using non-invasive, accessible, and relatively cheap off-the-shelf hacking equipment, such as SCA boards, trace analysis software, etc.

In general, this disclosure describes HMDs and peripheral devices that include encryption engines and decryption engines configured to apply two different types of masking at particular computational milestones within the encryption and decryption pipelines to obfuscate power trace information output by the device that includes the respective engine. By concealing intermediate data at particular computational stages of the processing pipelines using a masking technique suited to that particular computational stage, the encryption and decryption engines of this disclosure avail of the advantages of multiple types of masking, without incurring the power and operational costs associated with converting one type of mask to a different type of mask.

This disclosure focuses on encryption and decryption in the context of encrypted data communications between an HMD and peripheral device of an artificial reality system. However, it will be appreciated that the technical improvements of the configurations described in this disclosure may be incorporated into other types of systems that perform encryption and/or decryption, as well.

In one example, this disclosure is directed to a system on a chip (SoC) that includes a security processor and a decryption engine. The security processor is configured to form a Boolean mask, to perform a shift operation on the Boolean mask to obtain a shifted-row Boolean mask, and to add the shifted-row Boolean mask to cipher text to form Boolean-masked cipher text. The decryption engine is configured to apply a shift rows operation to the Boolean-masked cipher text to form byte-aligned Boolean-masked cipher text, to apply a product of the Boolean mask and a multiplicative mask to the byte-aligned Boolean-masked cipher text to form multiplicatively masked cipher text, to perform an inverse byte substitution operation on the multiplicatively masked cipher text at least in part by applying a product of the Boolean mask and an inverse of the multiplicative mask to the multiplicatively masked cipher text to form Boolean-masked intermediate data, and to apply mix columns logic to the Boolean-masked intermediate data to form byte-shifted Boolean-masked output data.

In another example, this disclosure is directed to a system on a chip (SoC) that includes a security processor and an encryption engine. The security processor is configured to form a Boolean mask, to perform a shift operation on the Boolean mask to obtain a shifted-row Boolean mask, and to add the shifted-row Boolean mask to input data to form Boolean-masked input data. The encryption engine is configured to apply a shift rows operation to the Boolean-masked input data to form byte-aligned Boolean-masked input data, to apply a product of the Boolean mask and a multiplicative mask to the byte-aligned Boolean-masked input data to form multiplicatively masked input data, to perform a byte substitution operation on the multiplicatively masked input data at least in part by applying a product of the Boolean mask and an inverse of the multiplicative mask to the multiplicatively masked input data to form Boolean-masked intermediate data, and to apply mix columns logic to the Boolean-masked intermediate data to form byte-shifted Boolean-masked cipher text.

In another example, this disclosure is directed to an artificial reality system. The artificial reality system includes a security processor and a decryption engine. The security processor is configured to form a Boolean mask, to perform a shift operation on the Boolean mask to obtain a shifted-row Boolean mask, and to add the shifted-row Boolean mask to cipher text to form Boolean-masked cipher text. The decryption engine is configured to apply a shift rows operation to the Boolean-masked cipher text to form byte-aligned Boolean-masked cipher text, to apply a product of the Boolean mask and a multiplicative mask to the byte-aligned Boolean-masked cipher text to form multiplicatively masked cipher text, to perform an inverse byte substitution operation on the multiplicatively masked cipher text at least in part by applying a product of the Boolean mask and an inverse of the multiplicative mask to the multiplicatively masked cipher text to form Boolean-masked intermediate data, and to apply mix columns logic to the Boolean-masked intermediate data to form byte-shifted Boolean-masked output data. The artificial reality system also includes a head-mounted device (HMD) configured to output artificial reality content including unmasked decrypted data formed from the byte-shifted Boolean-masked output data.

In another example, this disclosure is directed to an artificial reality system. The artificial reality system includes. The artificial reality system includes a peripheral device configured to receive input data. The artificial reality system also includes a security processor and an encryption engine. The security processor is configured to form a Boolean mask, to perform a shift operation on the Boolean mask to obtain a shifted-row Boolean mask, and to add the shifted-row Boolean mask to the input data to form Boolean-masked input data. The encryption engine is configured to apply a shift rows operation to the Boolean-masked input data to form byte-aligned Boolean-masked input data, to apply a product of the Boolean mask and a multiplicative mask to the byte-aligned Boolean-masked input data to form multiplicatively masked input data, to perform a byte substitution operation on the multiplicatively masked input data at least in part by applying a product of the Boolean mask and an inverse of the multiplicative mask to the multiplicatively masked input data to form Boolean-masked intermediate data, and to apply mix columns logic to the Boolean-masked intermediate data to form byte-shifted Boolean-masked cipher text.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
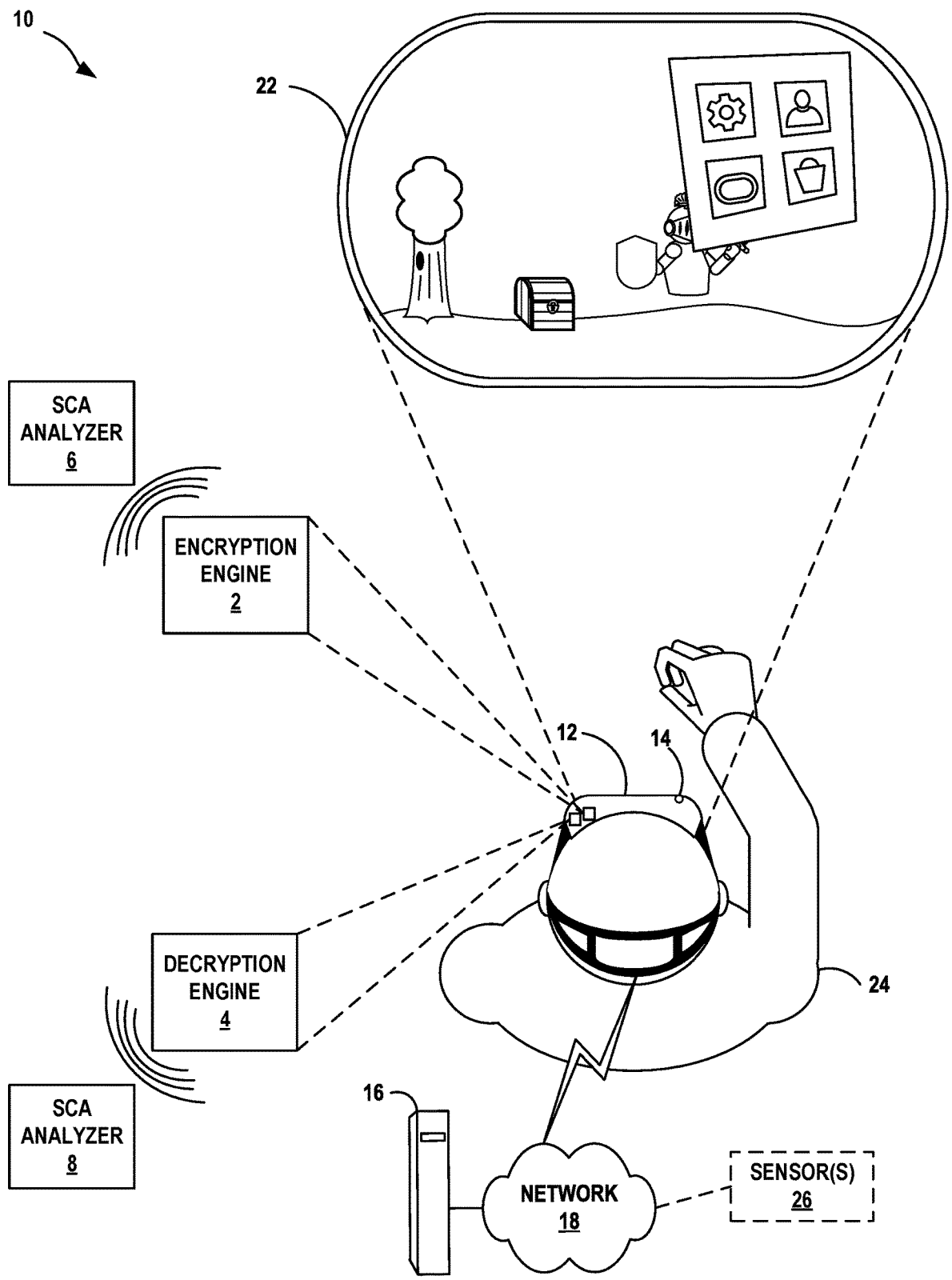
FIG. 1A is an illustration depicting an example artificial reality system of this disclosure, components of which are configured to thwart SCAs by encrypting input data and decrypting encrypted digital content using a hybrid masking scheme in the encryption and decryption pipelines, in accordance with aspects of this disclosure.

Many content provider systems, such as streaming systems, incorporate content protection or digital rights management technology that includes data encryption. The digital data encryption implemented by content provider systems may follow various standardized encryption mechanisms. The content consuming devices that receive the encrypted content perform generally reciprocal or "inverse" steps with respect to the encryption mechanisms, in accordance with the inverse steps specified in the corresponding standard according to which the data was encrypted.

Content consuming devices are often user-facing devices, and may also perform encryption of raw input data. In some examples, these user-facing devices may receive input data, encrypt the input data, and upload the encrypted data over a computer network, such as the Internet. These user-facing devices may encrypt input data for other purposes, as well. To the extent that certain portions of this disclosure focus on decryption-side functionalities of this disclosure performed by content consuming devices, it will be appreciated that those aspects of this disclosure provide benefits when implemented with respect to encryption-side functionalities performed by user-facing devices for digital content protection, as well.

Many devices configured to perform encryption and/or decryption are standalone devices that are relatively portable and battery-powered, and are therefore relatively vulnerable to attack or snooping mechanisms that rely on gleaning information about the hardware functioning of these devices. An example of such an attack mechanism is a so-called "side channel attack" or SCA. SCAs exploit one or more of timing information, current (flow of charge) information, power consumption data, electromagnetic traces and leaks, emitted sounds, etc.

Some examples of devices that perform encryption and/or decryption for content protection include artificial reality systems. Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, and may include one or more of virtual reality (VR), augmented reality (AR), mixed reality (MR), hybrid reality, or some combination and/or derivative thereof.

Typical artificial reality systems include one or more devices for rendering and displaying content to users. As one example, an artificial reality system may incorporate a head-mounted device (HMD) worn by a user and configured to output artificial reality content to the user. In some artificial reality systems, the HMD is communicatively coupled to a peripheral device, which may, in some examples, have a form factor similar to those of common handheld devices, such as a smartphone. The artificial reality content may include completely generated content or generated content combined with captured content (e.g., real-world video and/or real-world images). Many components of artificial reality systems, such as HMDs and peripheral devices, are battery powered. In these examples, HMDs and peripheral devices tend to be designed for low-power operation. The low-power designs and portable nature of HMDs and peripheral devices make HMDs and peripheral devices particularly vulnerable to SCAs. SCAs are often performed using non-invasive, accessible, and relatively cheap off-the-shelf hacking equipment, such as SCA boards, trace analysis software, etc.

FIG. 1A is an illustration depicting an example artificial reality system 10, components of which are configured to thwart SCAs by encrypting input data and decrypting encrypted digital content using a hybrid masking scheme in the encryption and decryption pipelines, in accordance with aspects of this disclosure. Components of artificial reality system 10 implement encryption and decryption pipelines modified using the hybrid masking scheme of this disclosure to obfuscate the power trace signatures output by these components. The hybrid masking technique of this disclosure maintains masked status of all data throughout the encryption and decryption pipelines, from ingress through egress and at all intermediate stages. The hybrid masking technique of this disclosure co-optimizes multiple digital masking methodologies by applying each different masking methodology just prior to the masked data entering a computational stage to which the selected masking methodology is well-suited. By leveraging different masking methodologies at encryption/decryption computational stages to which each particular masking methodology is well-suited, artificial reality system 10 avails of the SCA-thwarting improvements of these multiple masking methodologies, while eliminating the need for resource-expensive conversion circuits that would otherwise be required to convert masks between the different masking methodologies. In this way, artificial reality system 10 improves data security while minimizing the resource expenditure and implementation overhead for implementing the data security improvement of this disclosure.

Artificial reality system 10 is described herein as complying with the standardized decryption mechanisms described in the advanced encryption standard (AES) established by the United States National Institute of Standards and Technology (NIST) as a non-limiting example. It will be appreciated that artificial reality system 10 may, in other examples, implement the hybrid masking techniques of this disclosure while complying with other cipher standards, such as SM4 (formerly SMS4, a block cipher standard set forth in the Chinese National Standard for Wireless LAN WAPI), Camellia (developed by Mitsubishi Electric and NTT Corporation of Japan), etc. The hybrid masking techniques of this disclosure can be implemented in digital logic, and are therefore sufficiently polymorphic and scalable to provide SCA mitigation in various types of encryption engines and/or decryption engines, such as those that comply with the standards listed above and other standardized or non-standardized decryption engines, such as in artificial reality systems on a chip (SoCs).

While the SCA-thwarting encryption and decryption techniques of this disclosure are described with respect to being implemented within artificial reality system 10 as an example, it will be appreciated that the applicability of the decryption techniques of this disclosure are not limited to artificial reality systems. The encryption and decryption techniques of this disclosure can also be implemented to improve data security in other types of computing devices, including, but not limited to, various types of battery-powered SoC-driven and/or application specific integrated circuit (ASIC)-driven technologies.

The low-power design of various SoCs, such as artificial reality SoCs, are particularly vulnerable to SCAs, because artificial reality SoCs often process user-confidential information. Examples of user-confidential information that artificial reality SoCs often process include personal data, biometrics, user specific models, and various others. Artificial reality SoCs therefore represent relatively attractive hacking targets, for surreptitious acquisition of high value assets, such as the examples of digital assets listed above. For example, SCAs may extract secret key (e.g., cipher key and/or inverse cipher key) information by conducting and statistically analyzing current traces or electromagnetic (EM) traces.

Additionally, unlike cloud/server platforms in which large overall system power consumption tends to obfuscate encryption/decryption-related switching activity, artificial reality platforms are often power-optimized to prolong battery life. The power consumption statistics of artificial reality platforms are not well-hidden by other power-consuming functions. For this reason, artificial reality systems, particularly HMDs and lightweight peripheral devices, expose a broader attack surface by making it easier for an attack device, such as SCA analyzers to isolate encryption-related and/or decryption-related power consumption, and to analyze the power consumption statistics. The non-invasive nature of and the relatively easy access to SCA-driven hacking equipment further exacerbates the vulnerability of artificial reality HMDs.

The hybrid masking scheme of this disclosure enables one or more elements of artificial reality system 10 to disrupt the correlation, thereby obfuscating the power consumption metrics that are available to SCA hacking equipment, thereby reducing or potentially even fully scrambling the attack surface of these components of artificial reality system 10. Artificial reality system 10 includes head-mounted device (HMD) 12 and console 16. In some examples, artificial reality system 10 also includes one or more external sensors 26. In some examples, artificial reality system 10 also includes a peripheral device that is communicatively coupled to HMD 12. The peripheral device, in various implementations, may have a form factor similar to that of commonly available handheld devices (e.g. a smartphone, a tablet computer, or a personal digital assistant (PDA)). The peripheral device may be coupled to HMD 12 by wireless means (e.g., using short-range wireless communication protocols such as Bluetooth® or others, or long-range wireless communication protocols such as Wi-Fi™ or others), or may be tethered to HMD 12 by wired means.

As shown, HMD 12 is typically worn by user 24 and includes an electronic display and optical assembly for presenting artificial reality content 22 to user 24. In addition, HMD 12 includes one or more sensors (e.g., accelerometers) for tracking motion of HMD 12. HMD 12 may include one or more image capture devices 14, e.g., cameras, line scanners, and the like. Image capture devices 14 may be configured for capturing image data of the surrounding physical environment. In some examples, image capture devices 14 include inward-facing camera hardware and/or scanning hardware configured to capture facial images, retina scans, iris scans, etc. of user 24 for user authentication and for other purposes.

Console 16 is shown in the example of FIG. 1A as a single computing device, such as a gaming console, workstation, a desktop computer, or a laptop. In other examples, console 16 may be distributed across a plurality of computing devices, such as a distributed computing network, a data center, or a cloud computing system. HMD 12, console 16, HMD 12, and (in relevant instances, sensor(s) 26) may be communicatively coupled via network 18 (as shown in the example of FIG. 1A). Network 18 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards.

HMD 12 is shown in this example as being in communication with (e.g., tethered to or in wireless communication with) console 16. In other implementations, HMD 12 operates as a standalone, mobile platform configured to process artificial reality content. HMD 12 and/or console 16 may execute an artificial reality application to construct artificial reality content 22 for display to user 24. For example, HMD 12 and/or console 16 may construct the artificial reality content based on tracking pose information and computing pose information for a frame of reference, typically a viewing perspective of HMD 12. Artificial reality system 10 may use external sensors 26 and/or external camera hardware to capture three-dimensional (3D) information within the real-world, physical environment at which user 24 is positioned.

HMD 12 includes encryption engine 2 and decryption engine 4. Encryption engine 2 encrypts various raw or preprocessed or postprocessed input data, such as images captured by outward-facing camera hardware of image capture devices 14 of the surroundings of user 24 for analysis to determine location, weather, things of interest, places of interest etc. Another example of input data that encryption engine 2 may encrypt is facial image information that outward-facing camera hardware of image capture devices 14 captures for other people within the field of view (FoV) of HMD 12, to be used to identify such people using facial recognition technology. Yet another example of input data that encryption engine 2 may encrypt is biometric information of user 24, such as facial images captured by inward-facing camera hardware of image capture devices 14, or retina scans or iris scans captured by other inward-facing scanning hardware of HMD 12.

Encryption engine 2 may encrypt other examples of input data, as well, for a variety of intended end-uses. In some examples, HMD 12 may communicate the cipher text generated by encryption engine 2 to other devices, such as to console 16, to a peripheral device tethered to HMD 12 or paired to HMD 12 using short-range wireless communication technology, or over network 18 to a cloud-based system for further analysis or relaying.

Decryption engine 4 may decrypt cipher text (encrypted input data) generated by and received from various sources. In some examples, decryption engine 4 may decrypt cipher text that HMD 12 receives directly or indirectly from an upstream streaming service to obtain one or more of video data, audio data, or haptic output data. In other examples, decryption engine 4 may decrypt cipher text that HMD 12 receives directly or indirectly from an external system (e.g., another artificial reality system) to recover information identifying other users in an interactive gaming environment.

FIG. 1A illustrates SCA analyzers 6 and 8. SCA analyzer 6 represents a device that a malicious user (or SCA attacker) may use to isolate encryption-related power consumption of HMD 12 and analyze the power consumption statistics to surreptitiously obtain the cipher key that encryption engine 2 is applying at present. SCA analyzer 8 represents a device that an SCA attacker may use to isolate decryption-related power consumption of HMD 12 and analyze the power consumption statistics to surreptitiously obtain the inverse cipher key that encryption engine 2 is applying at present. The SCA attacker(s) may apply the cipher key and/or inverse cipher key(s) surreptitiously obtained in this way to reverse-engineer the secure content processed by encryption engine 2 and/or decryption engine 4, causing a security breach of sensitive or otherwise protected information.

The non-invasive nature of and the relatively easy access to SCA-driven hacking equipment (such as SCA analyzers 6 and/or 8) further exacerbates the vulnerability of artificial reality HMDs (such as HMD 12). Because SCA-driven hacking equipment typically obtains cipher key information and/or inverse cipher key information (collectively, a "secret key") for protected content by "sniffing" current leakage information externally, previous SCA-protection measures have focused on adding hardware components that introduce signals that obfuscate or hide the current leakage. Such additional hardware infrastructure is not well-suited to low-profile device designs and/or power-optimized battery-powered devices, due to the added hardware infrastructure and added energy consumption.

Encryption engine 2 and decryption engine 4 are configured to obfuscate the current leakage information by masking the data passed through their respective encryption and decryption datapaths using the hybrid masking technique of this disclosure. Encryption engine 2 and decryption engine 4 co-optimize an additive (or "Boolean") mask and a multiplicative mask during encryption and decryption, according to the hybrid masking technique of this disclosure. By masking all ingress, intermediate, and egress data using the hybrid masking scheme of this disclosure, encryption engine 2 and decryption engine 4 disrupt the correlation between the underlying (unmasked) data being processed and the current information that is leaked and sniffed by SCA analyzers 6 and 8, such that SCA analyzers 6 and 8 cannot derive the secret key. In this way, encryption engine 2 and decryption engine 4 mangle the power trace signature information that SCA analyzers 6 and 8 would otherwise use as basis data for conducting an SCA against HMD 12.

Encryption engine 2 and decryption engine 4 are implemented separately in silicon, at non-overlapping locations. As such, in use-case scenarios in which encryption engine 2 and decryption engine 4 are performing encryption and decryption operations simultaneously, the simultaneous encryption and decryption of data that is hidden using the hybrid masking techniques of this disclosure provide added security to each of encryption engine 2 and decryption engine 4. This added security stems from the simultaneous power trace mangling performed by both of encryption engine 2 and decryption engine 4, thereby further obfuscating the already incorrect power traces output by one another via the single hardware modality of HMD 12. In this way, the hybrid masking techniques of this disclosure enable encryption engine 2 and decryption engine 4 to disrupt power consumption races and the secret key presently under use, while maintaining data precision and standards-compliance by producing encrypted and decrypted output data that are unchanged from the outputs of traditional encryption and decryption techniques.

While shown in FIG. 1A and described above as being included in HMD 12, encryption engine 2 and decryption engine 4 may be included in console 16 in some examples, or may be included in a peripheral device coupled to HMD 12 in other examples. In examples in which artificial reality system includes a peripheral device that is coupled to and functions as a co-processing device with HMD 12, the peripheral device and HMD 12 may each include separate encryption and decryption engines that implement the hybrid masking techniques of this disclosure to thwart SCAs. In various examples, console 16 or the peripheral device may invoke the incorporated encryption engine and decryption engine to encrypt input data and to decrypt encrypted data received over network 18. In these examples, console 16 or the peripheral device may render the decrypted data, and communicate the decrypted content to HMD 12 for display to user 24. Similarly, in these examples, console 16 or the peripheral device may communicate the encrypted data over network 18, or nat process the encrypted data in some other manner. The data security enhancements of this disclosure are particularly helpful in examples in which console 16 or the peripheral device are of portable form factors, and thereby expose a larger attack surface to SCA analyzers 6 and 8.

The hybrid masking configurations of this disclosure call for relatively low redesign effort and relatively low overhead with respect to additional logic. As such, encryption engine 2 and decryption engine 4 may implement the SCA-mitigation measures of this disclosure without requiring significant changes to the overall infrastructure of HMD 12. As such, encryption engine 2 and decryption engine 4 may put the SCA-mitigation measures of this disclosure into effect without significantly affecting the wearability of HMD 12, which may take the form factor of headsets or glasses, or of portable implementations of console 16 in examples in which encryption engine 2 and decryption engine 4 are included in console 16, or of a portable peripheral device that may be coupled to HMD 12 to function as a co-processing device. In this way, the hybrid masking-based SCA-thwarting configurations of this disclosure enable low-profile designs with respect to HMD 12 and/or other devices that user 24 may use to avail of the capabilities provided by artificial reality system 10.

Figure 1B:
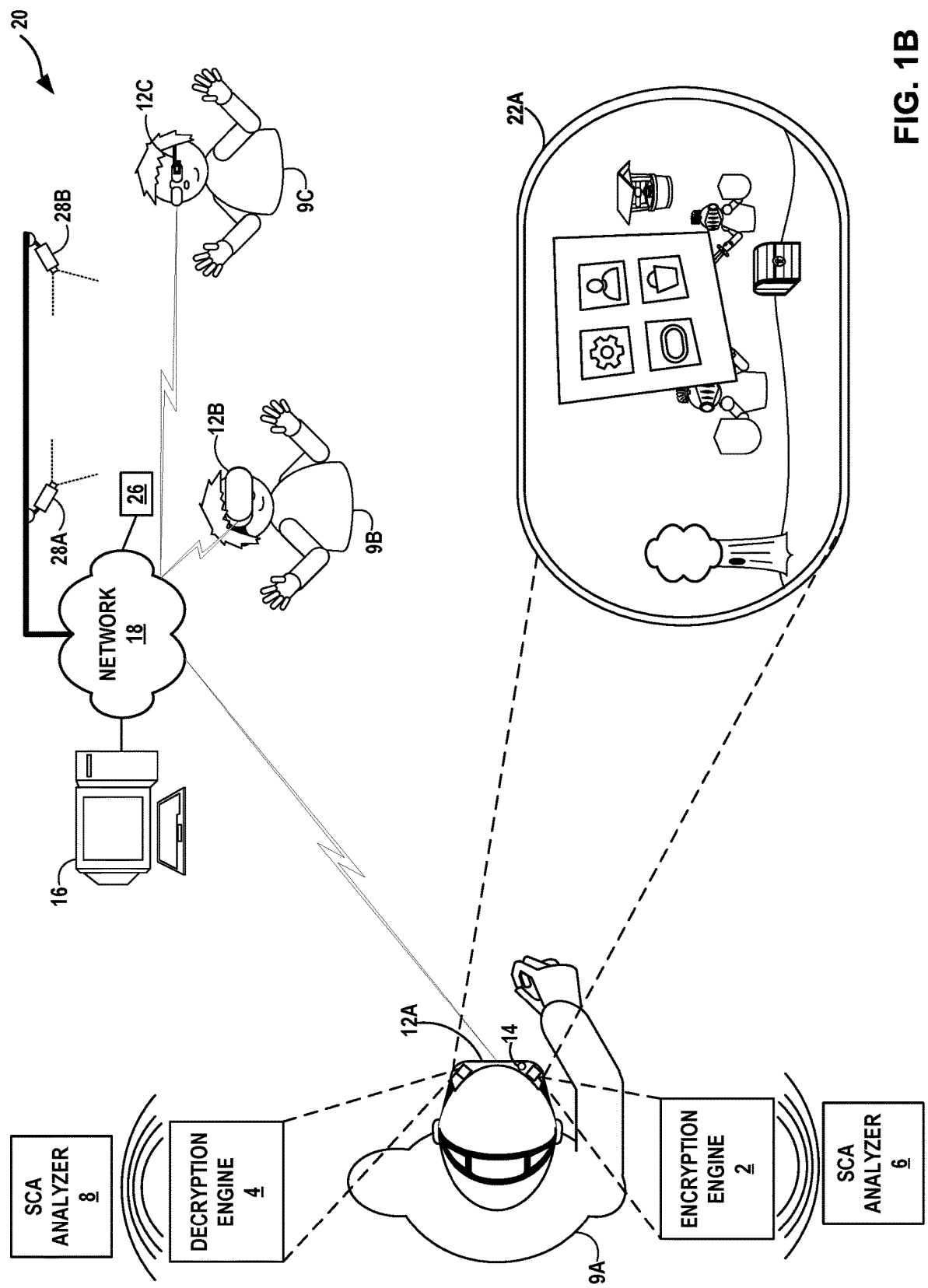
FIG. 1B is an illustration depicting another example artificial reality system that includes components configured to implement hybrid masking techniques of this disclosure within encryption and decryption datapaths to prevent SCAs.

FIG. 1B is an illustration depicting another example artificial reality system 20 that includes components configured to implement hybrid masking techniques of this disclosure within encryption and decryption datapaths to prevent SCAs. Similar to artificial reality system 10 of FIG. 1A, encryption engine 2 and decryption engine 4 included in HMD 12A of FIG. 1B may implement the hybrid masking techniques of this disclosure to improve data security, such as by improving resistance to SCAs performed by SCA analyzers 6 and 8. Encryption engine 2 and decryption engine 4 may encrypt and decrypt data with the added layer of security provided by the hybrid masking techniques of this disclosure during disparate time frames, during partially overlapping time frames, or during fully overlapping time frames, depending on the time frames during which HMD 12A invokes encryption engine 2 and decryption engine 4 to perform encryption and decryption operations, respectively. Encryption engine 2 and decryption engine 4 implement the hybrid masking techniques of this disclosure to conceal the data being processed at all stages of the respective encryption and decryption pipelines, thereby concealing the entirety of the attack surfaces upon which SCA analyzers 6 and 8 rely to conduct an SCA.

In the example of FIG. 1B, artificial reality system 20 includes external cameras 28A and 28B (collectively, "external cameras 28"), HMDs 12A-12C (collectively, "HMDs 12"), console 16, and sensors 26. As shown in FIG. 1B, artificial reality system 20 represents a multi-user environment in which an artificial reality application executing on console 16 and/or HMDs 12 presents artificial reality content to each of users 9A-9C (collectively, "users 9") based on a current viewing perspective of a corresponding frame of reference for the respective user 24. That is, in this example, the artificial reality application constructs artificial reality content by tracking and computing pose information for a frame of reference for each of HMDs 12. Artificial reality system 20 uses data received from external cameras 28 and/or HMDs 12 to capture 3D information within the real-world environment, such as motion by users 8 and/or tracking information with respect to users 8, for use in computing updated pose information for a corresponding frame of reference of HMDs 12.

HMDs 12 operate concurrently within artificial reality system 20. In the example of FIG. 1B, any of users 9 may be a "player" or "participant" in the artificial reality application, and any of users 9 may be a "spectator" or "observer" in the artificial reality application. HMDs 12 of FIG. 1B may each operate in a substantially similar way to HMD 12 of FIG. 1A. For example, HMD 12A may operate substantially similar to HMD 12 of FIG. 1A, and may receive user inputs by tracking movements of the hands of user 24A.

Each of HMDs 12 implements a respective user-facing artificial reality platform, and outputs respective artificial content, although only artificial reality content 22A output by HMD 12A is shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a goggle form factor and an eyeglass form factor.

Figure 2A:
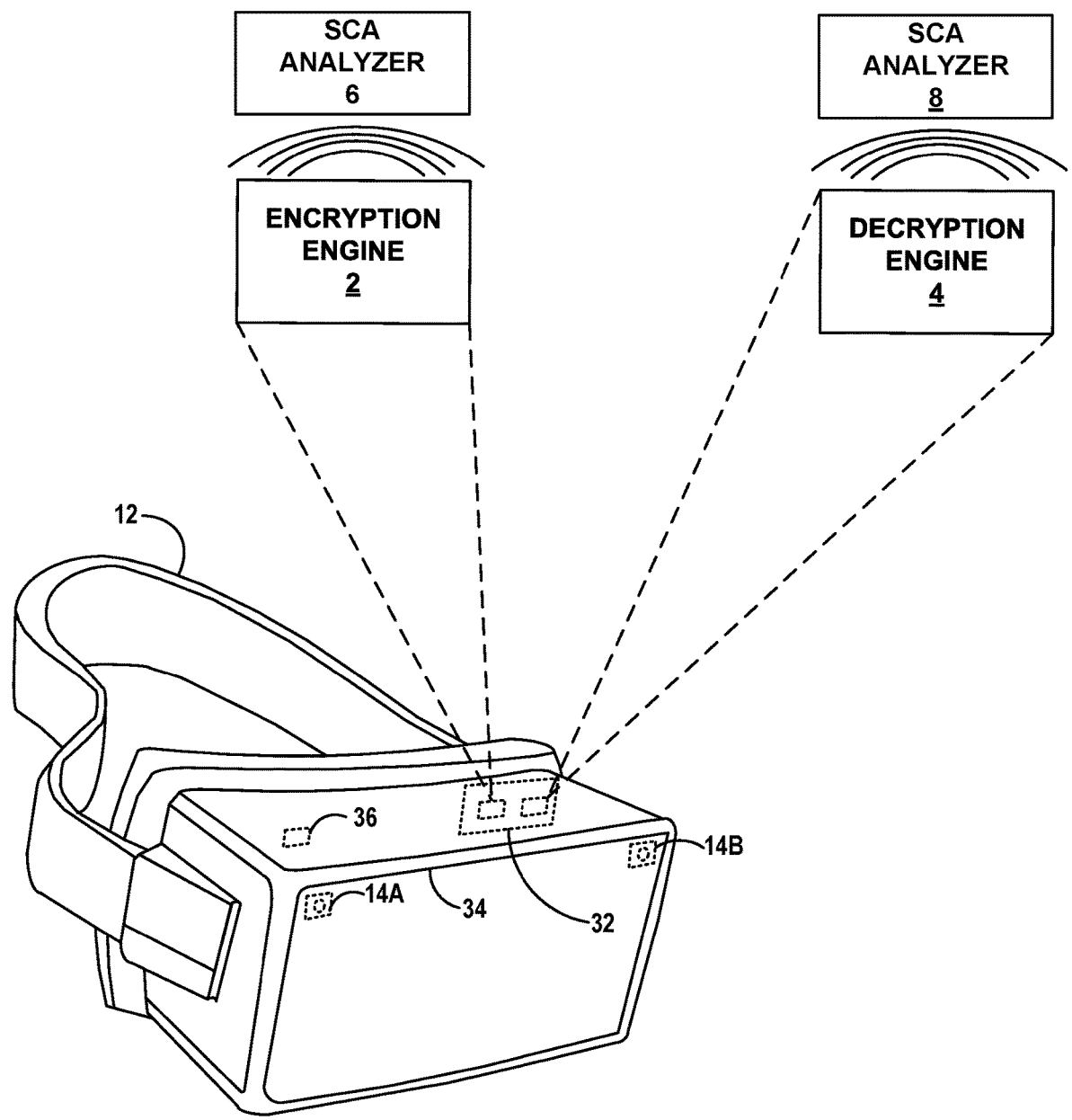
FIG. 2A is an illustration depicting an example HMD configured to encrypt input data before further processing/transmission, and to decrypt and render encrypted artificial reality content in an SCA-resistant manner in accordance with the techniques of the disclosure.

FIG. 2A is an illustration depicting an example HMD configured to encrypt input data before further processing/transmission, and to decrypt and render encrypted artificial reality content in an SCA-resistant manner in accordance with the techniques of the disclosure. HMD 12 of FIG. 2A may be an example of any of HMDs 12 of FIGS. 1A and 1B. In some examples, HMD 12 may be part of an artificial reality system that incorporates other devices and network intermediaries, such as in the examples of artificial reality systems 10 and 20 illustrated in FIGS. 1A and 1B. In other examples, HMD 12 may operate as a standalone, mobile artificial realty system configured to implement the SCA-thwarting techniques described herein. In the example of FIG. 2A, HMD 12 takes the general form factor of a headset or goggles.

In this example, HMD 12 includes a front rigid body and a band to secure HMD 12 to user 24. In addition, HMD 12 includes an interior-facing electronic display 34 configured to present artificial reality content to user 24. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and the user.

Figure 2B:
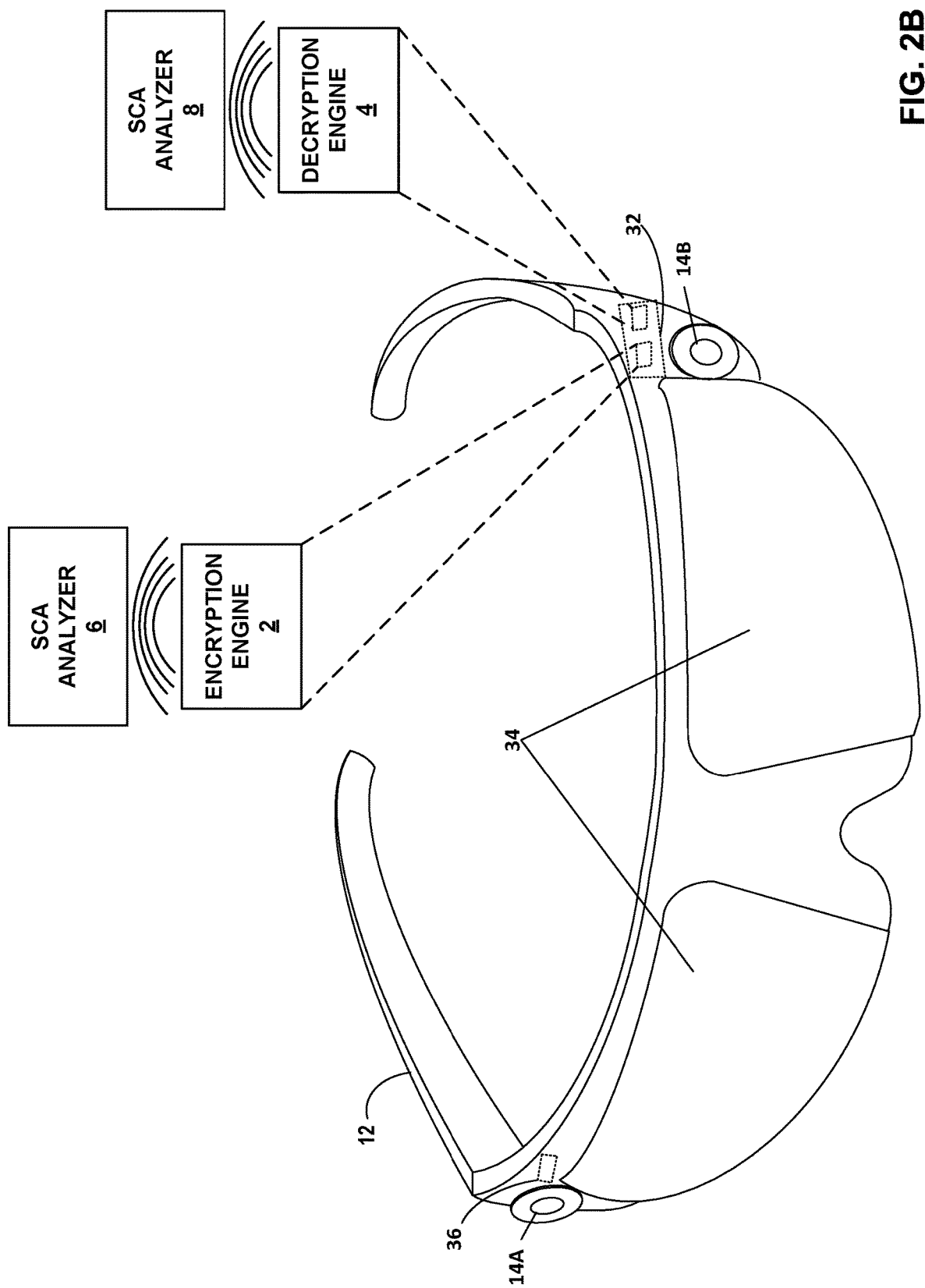
FIG. 2B is an illustration depicting another example of an HMD configured to encrypt input data, and to decrypt and render encrypted artificial reality content in an SCA-resistant manner in accordance with the techniques of the disclosure.

FIG. 2B is an illustration depicting another example of HMD 12 configured to encrypt input data, and to decrypt and render encrypted artificial reality content in an SCA-resistant manner in accordance with the techniques of the disclosure. HMD 12 of FIG. 2B may be an example of any of HMDs 12 of FIGS. 1A and 1B. HMD 12 may be part of an artificial reality system, such as artificial reality systems 10, 20 of FIGS. 1A, 1B, or may operate as a standalone, mobile artificial realty system configured to implement the techniques described herein. In the example of FIG. 2B, HMD 12 takes the general form factor of glasses.

In this example, HMD 12 includes a front rigid body and two stems to secure HMD 12 to a user, e.g., by resting over the user's ears. Elements of FIG. 2B that share reference numerals with elements of FIG. 2A perform like-functionalities, and are not described separately with respect to FIG. 2B for the sake of brevity. In the example of FIG. 2B, electronic display 34 may be split into multiple segments, such as into two segments, each segment corresponding to a separate lens disposed on the rigid front body of HMD 12. In other examples in accordance with FIG. 2B, electronic display 34 may form a contiguous surface that spans both lenses and the lens-connecting bridge (i.e., the over-the-nose portion) of the rigid front body of HMD 12. In some examples in accordance with the form factor illustrated in FIG. 2B, electronic display 34 may also encompass portions of HMD 12 that connect the lenses of the front rigid body to the stems, or optionally, portions of the stems themselves. These various designs of electronic display 34 in the context of the form factor of HMD 12 shown in FIG. 2B improve accessibility for users having different visual capabilities, eye movement idiosyncrasies, etc.

In the examples illustrated in each of FIGS. 2A & 2B, HMD 12 further includes one or more motion sensors 36, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment.

In the examples illustrated in each of FIGS. 2A & 2B, HMD 12 includes integrated image capture devices 14A and 14B (collectively, "image capture devices 14"). Image capture devices 14 may include still image camera hardware, video camera hardware, laser scanners, Doppler® radar scanners, fundus photography hardware, infrared imaging cameras, depth scanners, or the like. Image capture devices 14 may include outward-facing and/or inward-facing image capture hardware, and include any hardware configured to capture image data representative of a surrounding physical environment, and optionally, to preprocess and/or post process the captured image data. Outward-facing camera hardware of image capture devices 14 may capture image data of the physical environment outside of HMD 12, such as, but not limited to, the real-world environment at which user 24 is positioned. Inward-facing camera hardware of image capture devices 14 may capture image data of the wearer of HMD 12, such as facial images and/or retina scans. Other inward-facing sensor hardware of HMD 12 may capture other types of information pertaining to the wearer, such as temperature information or other types of information or metrics.

In the examples illustrated in FIGS. 2A & 2B, internal control unit 32 of HMD 12 includes encryption engine 2 and decryption engine 4 illustrated in FIGS. 1A & 1B. As described above with respect to FIGS. 1A & 1B, encryption engine 2 and decryption engine 4 are configured to employ the hybrid masking scheme of this disclosure to conceal the actual data being processed during encryption and decryption, thereby upsetting the correlations between the power trace information leaked by HMD 12 and the actual data being processed in the encryption and decryption pipelines implemented by encryption engine 2 and/or decryption engine 4, respectively.

FIGS. 2A & 2B also illustrate SCA analyzers 6 and 8. Each of SCA analyzers 6 and 8 represents an SCA board (e.g., an FPGA-based board or ASIC-based board), a so-called "skimmer," or any other device configured to snoop on the performance metrics of HMD 12. Hackers may use SCA analyzers 6 and/or 8 to implement various types of SCAs, such as a correlation power attack (CPA) or a direct memory access (DMA) attack. To perform a CPA, SCA analyzer 6 or 8 provides an input data set to HMD 12. A common example of a CPA involves providing one million test vectors that undergo encryption or decryption with a constant secret key, such as would be performed by an encryption engine that performs encryption operations to encrypt input data to form cipher text, or a decryption engine that performs decryption (operations that are reciprocal to the above-described encryption operations) to decrypt the cipher text. Various examples are described with respect to AES-compliant encryption and decryption, but it will be appreciated that the glitch randomization techniques of this disclosure are also applicable to encryption and decryption operations that conform to other standards or are not compliant to any presently standard.

Each of SCA analyzers 6 and 8 collects power traces of the AES-compliant system, and analyzes the current traces against a hypothesis that predicts the outcome for a given guess of the key. SCA analyzers 6 and 8 guess the secret key (round key and inverse round key, respectively) one byte at a time, thereby providing 256 possibilities for every byte. SCA analyzers 6 and 8 compute statistical correlation coefficients between the measured power traces and each hypothesis across all 256 candidate key bytes. SCA analyzers 6 and 8 each select the pairing that produces the highest correlation metric as the secret key guess. An important pre-processing step required for SCA analyzers 6 and 8 to compute the correlation metrics is to first align the power traces. By first aligning the power traces, SCA analyzers 6 and 8 ensure that the value of the power signature gleaned from different traces each correspond to a unique switching event in the AES-compliant SoC (or SoC configured in another way, as the case may be).

According to configurations of this disclosure, encryption engine 2 and decryption engine 4 exploit the reliance of SCA analyzers 6 and 8 on the pre-processing step of aligning the power traces in order to generate the individual hypotheses corresponding to the unique power traces. Encryption engine 2 and decryption engine 4 implement the SCA-thwarting techniques of this disclosure by disrupting the alignment operations that SCA analyzers 6 and 8 perform as pre-processing steps in the above-described CPAs.

Encryption engine 2 and decryption engine 4 implement the hybrid masking techniques of this disclosure throughout the runtime of the respective encryption and decryption pipelines, thereby decorrelating the power traces collected by SCA analyzers 6 and 8 from the actual (unmasked) data ultimately being encrypted/decrypted. In this way, encryption engine 2 and decryption engine 4 disrupt the correlation between the power traces collected by SCA analyzers 6 and 8 and the secret key (cipher key or inverse cipher key, as the case may be), thereby mangling the essential preprocessing step of power trace alignment upon which SCA analyzers 6 and 8 rely in performing the CPA. Because SCA analyzers 6 and 8 form the power trace correlations by relying on particular chronological sequences based on reverse engineering the AES-specified procedures to arrive at the encrypted cipher text or the decrypted output, encryption engine 2 and decryption engine 4 implement the hybrid masking operations of this disclosure to provide power traces that SCA analyzers 6 and 8 are not configured to use to accurately reconstruct as part of performing a CPA. That is, encryption engine 2 and decryption engine 4 implement the hybrid masking operations of this disclosure to output power trace signatures that do not match the actual (unmasked) data that is ultimately under encryption/decryption.

Figure 2C:
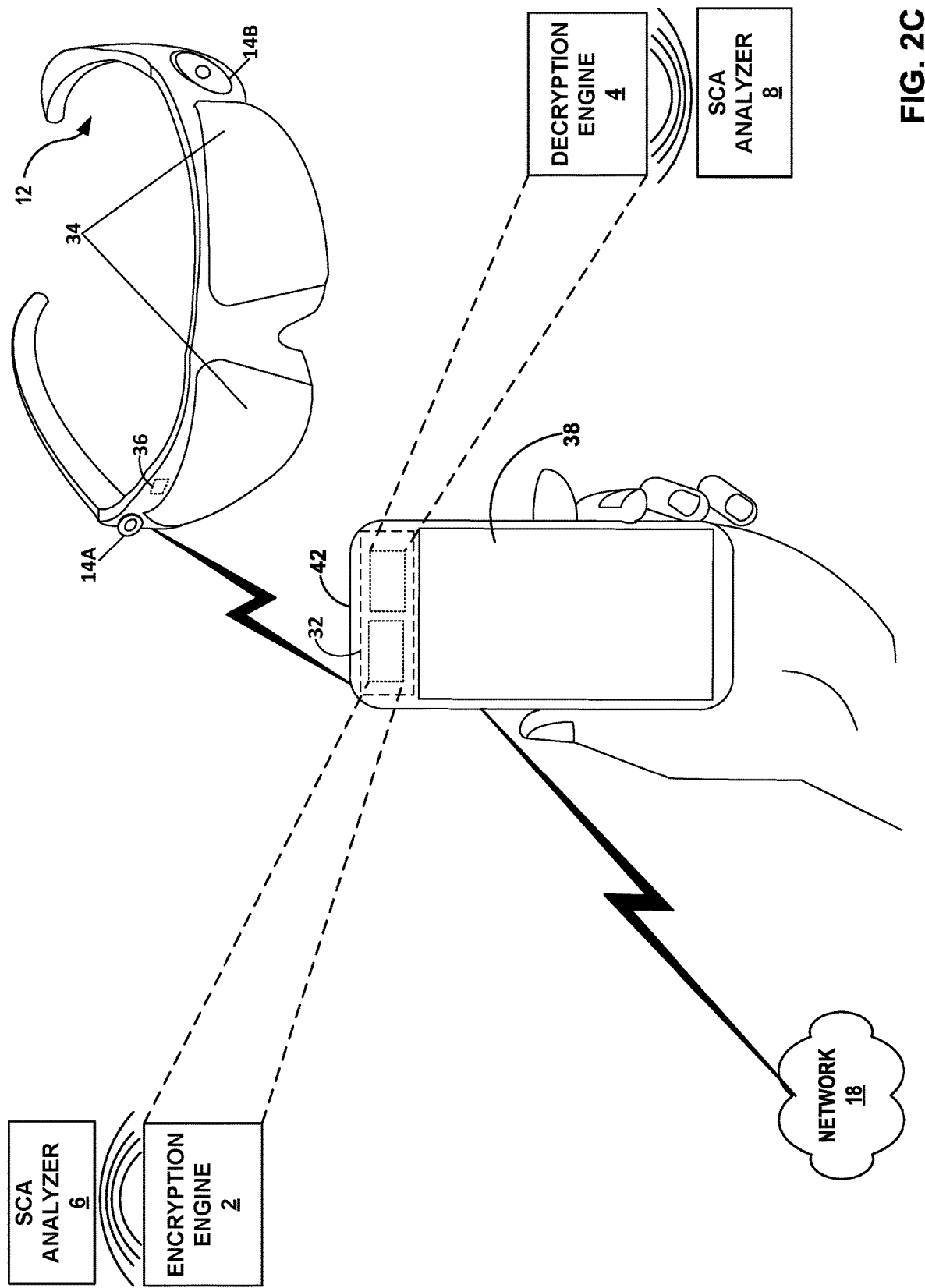
FIG. 2C is an illustration depicting an example of a peripheral device configured to encrypt input data, and to decrypt and render encrypted artificial reality content in an SCA-resistant manner in accordance with the techniques of the disclosure.

FIG. 2C is an illustration depicting an example of a peripheral device configured to encrypt input data, and to decrypt and render encrypted artificial reality content in an SCA-resistant manner in accordance with the techniques of the disclosure. In the example of FIG. 2C, peripheral device 42 performs some or all of the hybrid masking-based SCA-thwarting techniques of this disclosure. HMD 12 of FIG. 2C may be an example of any of HMDs 12 of FIGS. 1A and 1B, and takes the form factor of glasses, as in the case of HMD 12C of FIG. 1B and HMD 12 of FIG. 2B. HMD 12 may be part of an artificial reality system, such as artificial reality systems 10 and/or 20 of FIGS. 1A and 1B, in some examples. In other examples, HMD 12 may operate as a standalone, mobile artificial reality system configured to implement the glitch randomization-based SCA-thwarting techniques described herein. In the example of FIG. 2C, image capture devices 14 may capture image data representative of various objects, including peripheral device 42 and/or of the hand(s) of user 24 in the physical environment that are within the FoV of image capture devices 14, which may generally correspond to the viewing perspective of HMD 12.

In the example of FIG. 2C, control unit 32 is implemented in peripheral device 42, which, in turn, is communicatively coupled to HMD 12. Control unit 32 of peripheral device 42 includes encryption engine 2 and decryption engine 4 in the example of FIG. 2C. In some examples, peripheral device 42 may receive encrypted data (e.g., streaming video data, etc.) over network 18, and may invoke decryption engine 4 to decrypt the encrypted data to be used in the generation and rendering of artificial reality content 22 for display on electronic display 34.

In some examples, peripheral device 42 may receive encrypted data from HMD 12 (e.g., encrypted facial images and/or retina scans of user 24), and may invoke decryption engine 4 to decrypt the received cipher text for user authentication purposes. Peripheral device 42 may invoke encryption engine 2 to encrypt data for various purposes, such as for encryption prior to transmission over network 18, or for other purposes, as described above with respect to FIGS. 1A-2B.

Surface 38 of peripheral device 42 represents an input component or a combined input/output component of peripheral device 42. Surface 38 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 38 may enable peripheral device 42 to receive touch input or gesture input without direct contact with surface 38. User 24 may provide these touch or gesture inputs to peripheral device 42 to provide instructions directly to peripheral device 42, or indirectly to HMD 12 and/or other components of an artificial reality system in which HMD 12 is deployed. In some examples, processing circuitry of HMD 12 may utilize image capture devices 14 to analyze configurations, positions, movements, and/or orientations of peripheral device 42, of the hand(s) or digit(s) thereof of user 24 to enable to provide input using gestures such as drawing gestures or typing gestures provided via a graphical keyboard.

Peripheral device 42 can communicate input to HMD 12 (and/or console 16) using wireless communications links (e.g., Wi-Fi™, near-field communication of short-range wireless communication such as Bluetooth®, etc.), or using wired communication links, or combinations thereof, or using other types of communication links. In the example of FIG. 2C, peripheral device 42 is also communicatively coupled to network 18, thereby enabling peripheral device 42 to upload cipher text generated by encryption engine 2 to securely communicate data to remote devices over network 18.

In this way, peripheral device 42 may offload various hardware and resource burdens from HMD 12, which enables low-profile form factor designs of HMD 12. Peripheral device 42 also serves as a communications intermediary between HMD 12 and devices at remote locations, via network 18. Further details of peripheral device 42 are described in U.S. patent application Ser. No. 16/506,618 (filed on 9 Jul. 2019), the entire content of which is incorporated herein by reference.

Control unit 32 may represent hardware or a combination of hardware and software configured to support various components (e.g., encryption engine 2 and/or decryption engine 4), or modules, elements, or operations described herein. In examples in which encryption engine 2 is formed as an integrated circuit (IC), encryption engine 2 represents an "encryption IC." In examples in which decryption engine 4 is formed as an IC, decryption engine 4 represents a "decryption IC." As such, the terms "encryption IC" and "decryption IC" may be used interchangeably with encryption engine 2 and decryption engine 4, respectively.

While FIG. 2C illustrates encryption engine 2 and decryption engine 4 as being implemented in peripheral device 42, it will be appreciated that, in many examples both peripheral device 42 and HMD 12 include separate encryption and decryption engines. For instance, inter-SoC communications between respective SoCs of HMD 12 and peripheral device 42 may be in the form of so-called "crypto packets" that include encrypted payloads and plain text headers. In these examples, HMD 12 may invoke its encryption engine to encrypt the payloads before sending crypto packets to peripheral device 42, and may invoke its decryption engine to decrypt encrypted payloads obtained from decapsulating crypto packets received from peripheral device 42. Similarly, peripheral device 42 may invoke its encryption engine to encrypt the payloads before sending crypto packets to HMD 12, and may invoke its decryption engine to decrypt encrypted payloads obtained from decapsulating crypto packets received form HMD 12. In these examples, the respective encryption and decryption engines of both peripheral device 42 and HMD 12 may be configured to implement the hybrid masking techniques of this disclosure during encryption and decryption, to conceal the actual data being processed at any given time during the runtime of an encryption pipeline or decryption pipeline.

Figure 2D:
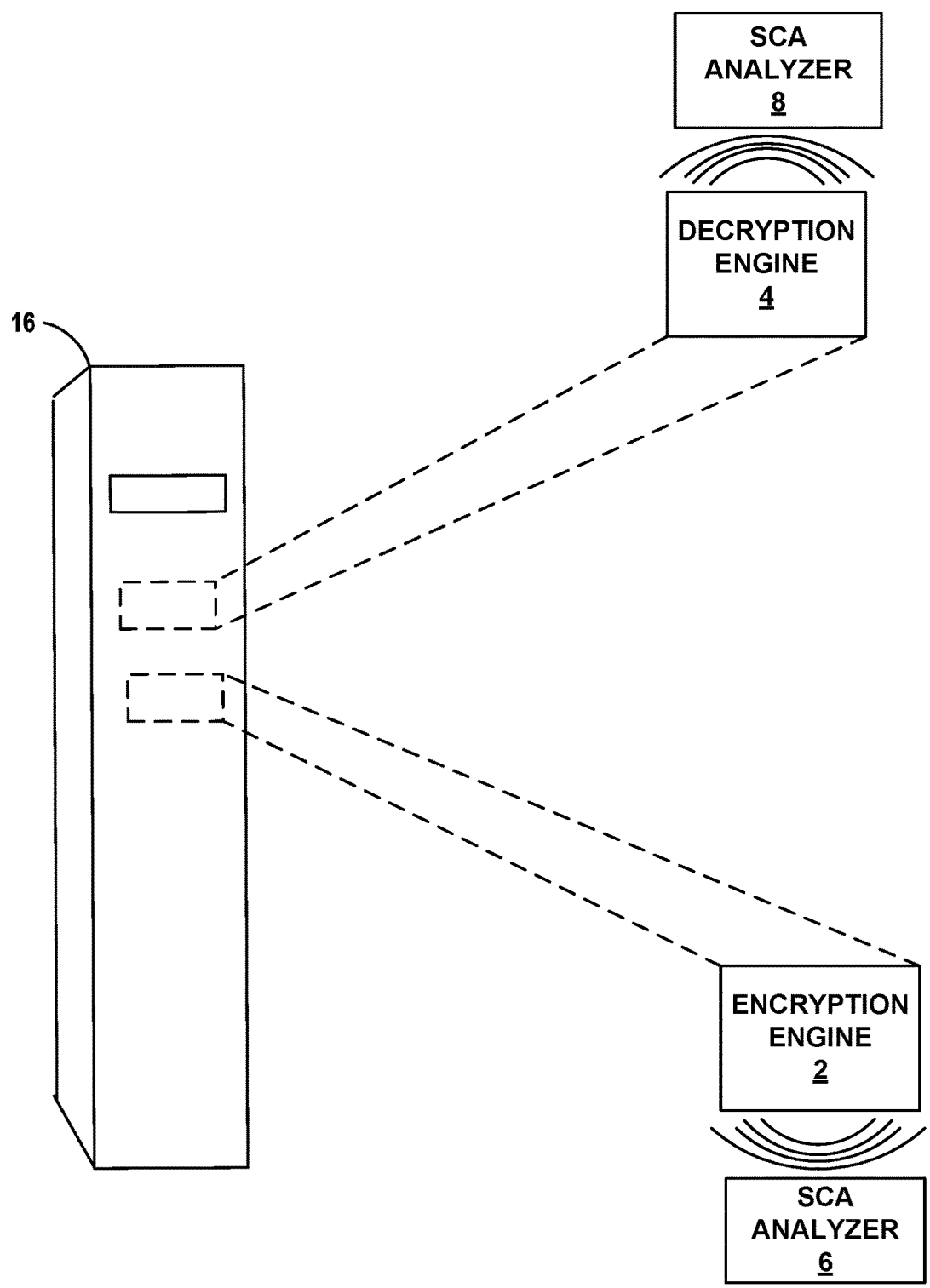
FIG. 2D is an illustration depicting an example of a console configured to encrypt input data, and to decrypt and render encrypted artificial reality content in an SCA-resistant manner in accordance with the techniques of the disclosure.

FIG. 2D is an illustration depicting an example of console 16 being configured to encrypt input data, and to decrypt and render encrypted artificial reality content in an SCA-resistant manner in accordance with the techniques of the disclosure. FIG. 2D is an illustration depicting an example in which console 16 includes encryption engine 2 and decryption engine 4. That is, in the example illustrated in FIG. 2D, encryption engine 2 and decryption engine 4 are part of console 16, instead of being implemented in HMD 12 as in the examples of FIGS. 2A & 2B and instead of being implemented in peripheral device 42 as in the example of FIG. 2C.

In various use case scenarios in accordance with FIG. 2D, hacker(s) may place SCA analyzer 6 and/or SCA analyzer 8 in the vicinity of console 16, in an attempt to obtain the power traces used for a CPA. SCA analyzers 6 and/or 8 may carry out a CPA with significant accuracy, especially in cases in which console 16 is a battery-powered handheld device that is optimized for low power usage. In these cases, console 16 may not put out large-scale power information for non-encryption, non-decryption operations to an extent that is sufficient to conceal the power information related to encryption and/or decryption information.

In the example of FIG. 2D, encryption engine 2 and decryption engine 4 may implement the hybrid masking techniques of this disclosure described with respect to FIGS. 1A-2C, but in the context of console 16. While FIG. 2D illustrates encryption engine 2 and decryption engine 4 as being implemented in console 16, it will be appreciated that, in many examples both console 16 and HMD 12 include separate encryption and decryption engines. For instance, inter-SoC communications between respective SoCs of HMD 12 and console 16 may be in the form of crypto packets that include encrypted payloads and plain text headers. In these examples, HMD 12 may invoke its encryption engine to encrypt the payloads before sending crypto packets to console 16, and may invoke its decryption engine to decrypt encrypted payloads obtained from decapsulating crypto packets received from console 16. Similarly, console 16 may invoke its encryption engine to encrypt the payloads before sending crypto packets to HMD 12, and may invoke its decryption engine to decrypt encrypted payloads obtained from decapsulating crypto packets received form HMD 12. In these examples, the respective encryption and decryption engines of both console 16 and HMD 12 may be configured to implement the hybrid masking techniques of this disclosure during encryption and decryption, to conceal the actual data being processed at any given time during the runtime of an encryption pipeline or decryption pipeline.

As such, whether implemented within HMD 12, within peripheral device 42, or within console 16, encryption engine 2 and decryption engine 4 thwart SCAs, such as CPAs, by implementing the hybrid masking scheme of this disclosure to apply particular random number-based masking methodologies at particular computational stages of the encryption and decryption processes, based on the suitability of a particular random number-based masking methodology to that particular computational stage. By outputting power trace signatures that are not true to the actual (unmasked) data being encrypted/decrypted, encryption engine 2 and decryption engine 4 conceal from SCA analyzer 6 and/or SCA analyzer 8 the power trace information necessary at preprocessing for SCA analyzer 6 and/or SCA analyzer 8 to carry out a CPA. Moreover, the hybrid masking scheme of this disclosure enables encryption engine 2 and decryption engine 4 to maintain data concealment throughout the encryption and decryption processes, thereby concealing the entire attack surface of the encryption and decryption pipelines with no gaps in the concealment. Encryption engine 2 and decryption engine 4 may implement the hybrid masking techniques of this disclosure to thwart CPAs in a variety of deployments, as described with respect to the examples shown in FIGS. 2A-2D. In this way, encryption engine 2 and decryption engine 4 implement the hybrid masking techniques of this disclosure to improve data security in a variety of single-device and multi-device configurations with which artificial reality systems 10 and 20 are compatible.

Figure 3A:
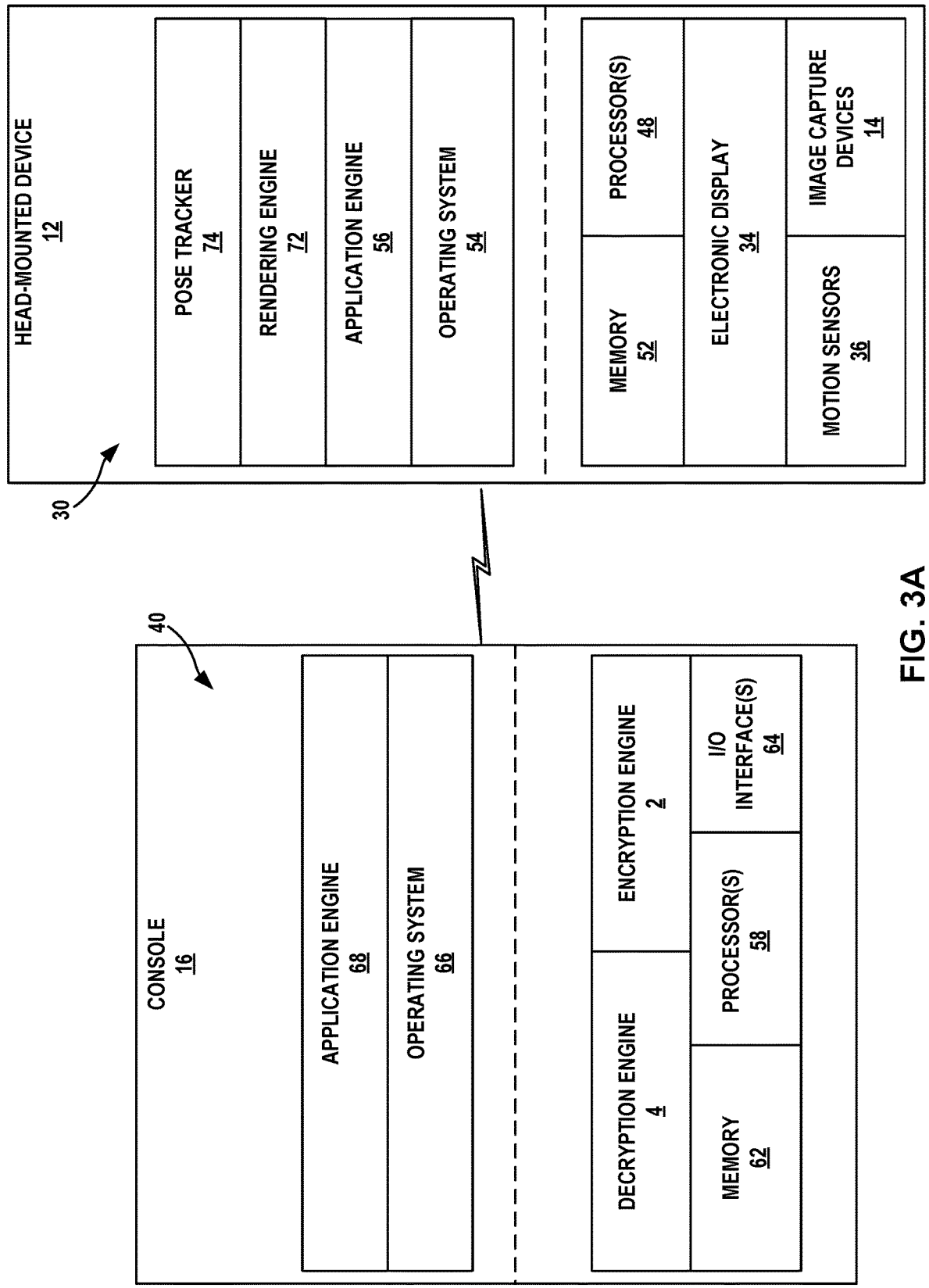
FIGS. 3A-3D are block diagrams showing example implementations of devices of FIGS. 1A-2D that are configured to encrypt input data, and to decrypt and render encrypted artificial reality content, in accordance with aspects of this disclosure.

FIGS. 3A-3D are block diagrams showing example implementations of devices of the artificial reality systems of FIGS. 1A-2D. FIG. 3A is a block diagram showing example implementations of console 16 and HMD 12 of artificial reality systems 10 & 20 of FIGS. 1A & 1B. In this example, HMD 12 includes one or more processors 48 and memory 52 that, in some examples, provide a computer platform for executing an operating system 54. Operating system 54 may represent an embedded, real-time multitasking operating system, for instance, or other type of operating system. In turn, operating system 54 provides a multitasking operating environment for executing one or more software components 30, including application engine 56, rendering engine 72, and pose tracker 74.

Responsive to control by application engine 68, rendering engine 72 generates artificial reality content 22 (e.g., incorporating 3D artificial reality content) for display to user 24 by application engine 56 of HMD 12, as determined by pose tracker 74. Based on the current viewing perspective, rendering engine 72 constructs artificial reality content 22 (e.g., 3D artificial content) which may in some cases be overlaid, at least in part, upon the real-world 3D environment of user 24. During this process, pose tracker 74 operates on sensed data received from HMD 12, such as movement information and user commands, and, in some examples, data from any external sensors 26 (shown in FIGS. 1A & 1B), such as external cameras 28 of FIG. 1B, to capture 3D information within the real-world environment, such as motion by user 24 and/or feature tracking information with respect to user 24.

Based on the sensed data, pose tracker 74 determines a current pose for the frame of reference of HMD 12 and, in accordance with the current pose, constructs artificial reality content 22 for communication, via one or more I/O interfaces 64, to HMD 12 for display to user 24. Processor(s) 48 may be coupled to one or more of electronic display 34, motion sensors 36, and image capture devices 14. In some examples, processor(s) 48 and memory 52 may be separate, discrete components. In other examples, memory 52 may be on-chip memory collocated with processors 48 within a single integrated circuit.

In general, console 16 represents a computing device that processes image and tracking information received from external cameras 28 (FIG. 1B) and/or HMD 12 to perform motion detection, user interface generation, and various other artificial reality-related functionalities for HMD 12. In some examples, console 16 is a single computing device, such as a workstation, a desktop computer, a laptop, or a gaming system. In some examples, at least a portion of console 16, such as one or more processor(s) 58 and/or memory 62, may be distributed across a cloud computing system, a data center, or across a network, such as the Internet, or another public or private communications network, for instance, broadband, cellular, Wi-Fi™, and/or other types of communication networks for transmitting data between computing systems, servers, and computing devices.

In the example of FIG. 3A, console 16 includes one or more processors 58 and memory 62 that, in some examples, provide a computer platform for executing an operating system 66. Operating system 66 may represent an embedded, real-time multitasking operating system, for instance, or other type of operating system. In turn, operating system 66 provides a multitasking operating environment for executing one or more software components 40. Processor(s) 58 may be coupled to one or more I/O interfaces 64, which provide one or more I/O interfaces for communicating with external devices, such as a keyboard, game controllers, display devices, image capture devices, HMDs (e.g., HMD 12), and the like. Moreover, one or more I/O interfaces 64 may include one or more wired or wireless network interface controllers (NICs) for communicating with a network, such as network 18.

Each of processors 48, 58 may comprise any one or more of a multi-core processor, a controller, a digital signal processor (DSP), an application specific integrated circuit (ASIC), a field-programmable gate array (FPGA), processing circuitry (e.g., fixed function circuitry or programmable circuitry or any combination thereof) or equivalent discrete or integrated logic circuitry. Memory 52, 62 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 40 of console 16 operate to provide an overall artificial reality application. In this example, software applications 40 include application engine 68 and operating system 66. In general, application engine 68 includes functionality to provide and present an artificial reality application, e.g., a teleconference application, a gaming application, a navigation application, an educational application, a training application, a simulation application, or the like. Application engine 68 may include, for example, one or more software packages, software libraries, hardware drivers, and/or Application Program Interfaces (APIs) for implementing an artificial reality application. Application engine 68 co-processes with one or more of software applications 30 of HMD 12 to construct artificial reality content 22 for display to user 24 in accordance with current pose information for a frame of reference, typically a viewing perspective of HMD 12, as determined by pose tracker 74 of HMD 12.

In the example of FIG. 3A, console 16 includes encryption engine 2 and decryption engine 4, which are described above with respect to FIGS. 1A-2D. In some examples, console 16 may receive encrypted data, using I/O interface(s) 64, from an external system (e.g., an upstream streaming service), and may invoke decryption engine 4 to decrypt the encrypted data that was received. In some of these examples, console 16 may invoke rendering engine 72 to then render the decrypted data, and console 16 may provide the rendered data to HMD 12 in form of artificial reality content 22.

In other examples, console 16 may receive, via I/O interface(s) 64, encrypted data (e.g., encrypted facial images and/or encrypted iris scan information captured by inward-facing camera/scanner hardware of HMD 12) from HMD 12. In these examples, console 16 may invoke decryption engine 4 to decrypt the encrypted data received from HMD 12, and further process the decrypted data for user authentication and/or other purposes. In still other examples, console 16 may receive, via I/O interface(s) 64, raw input data from HMD 12, and may invoke encryption engine 2 to encrypt the raw input data before forwarding the resulting cipher text to other devices using I/O interface(s) 64. Console 16 and HMD 12 may communicate using crypto packet flows, in these examples.

Figure 3B:
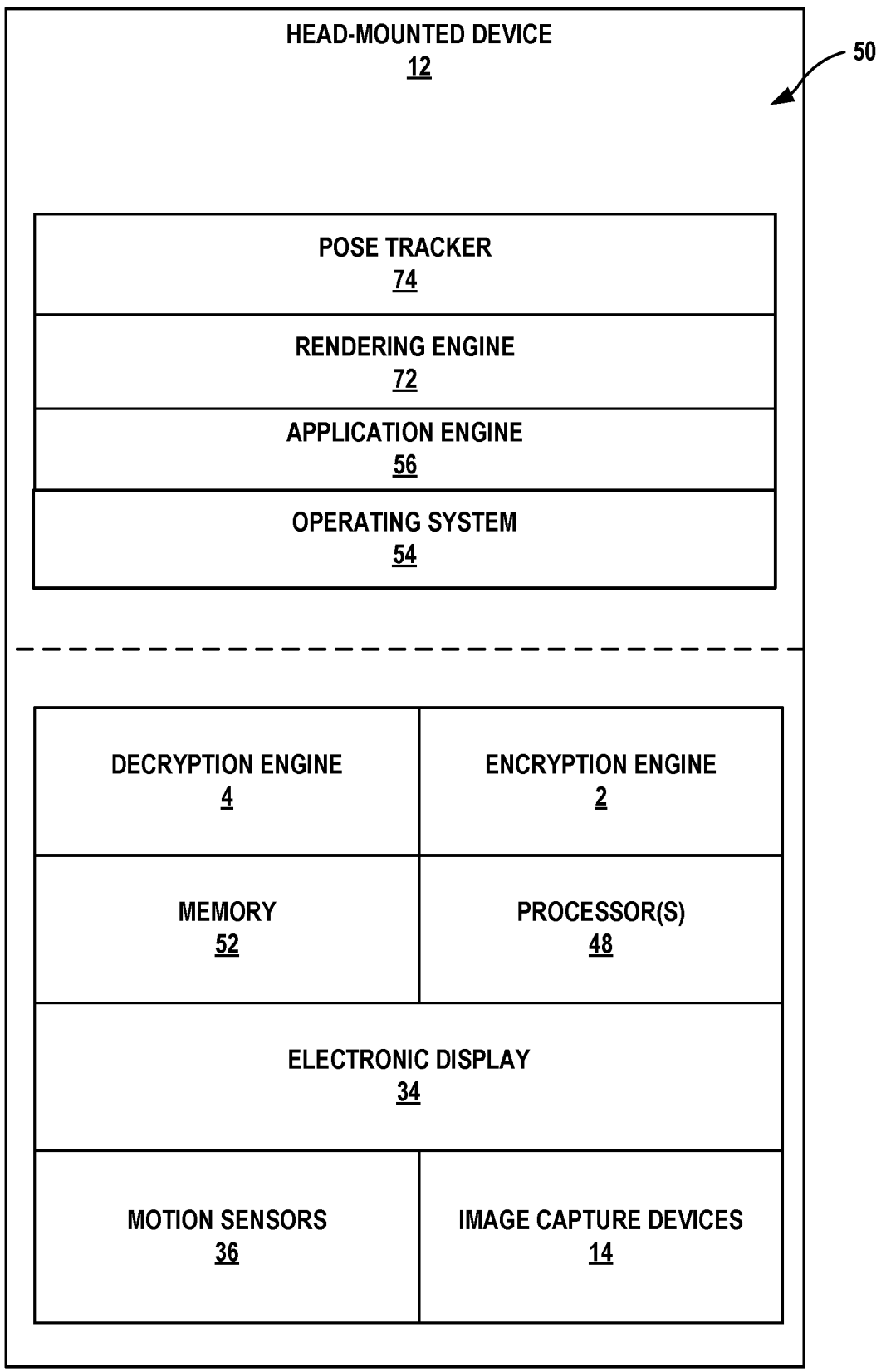

FIG. 3B is a block diagram depicting an example implementation of HMD 12 of artificial reality systems 10 & 20 of FIGS. 1A & 1B. In this example, as in the example of FIG. 3, HMD 12 includes one or more processors 48 and memory 52 that, in some examples, provide a computer platform for executing an operating system 54. Operating system 54 may represent an embedded, real-time multitasking operating system, for instance, or other type of operating system. Operating system 54 provides a multitasking operating environment for executing one or more software components 50. Moreover, processor(s) 48 are coupled to electronic display 34, motion sensors 36, and image capture devices 14.

In the example of FIG. 3B, software components 50 operate to provide an overall artificial reality application. In this example, software applications 50 include application engine 440, rendering engine 72, and pose tracker 74. In various examples, software components 50 operate in a similar manner to the similarly numbered counterpart components of FIG. 3A, in which these counterpart components are integrated into console 16. That is, software applications may construct the artificial content for display to user 24. In some examples, rendering engine 72 constructs artificial reality content 22 (e.g., 3D artificial reality content) which may be overlaid, at least in part, upon the real-world, physical environment in the FoV of user 24.

In the example of FIG. 3B, HMD 12 includes encryption engine 2 and decryption engine 4, which are described above with respect to FIGS. 1A-3A. For example, HMD 12 may receive encrypted data directly over network 18, or via an intermediate device, such as console 16, that may relay the encrypted data, in encrypted form, to HMD 12. In these examples, HMD 12 invokes decryption engine 4 to decrypt and reconstruct the encrypted data to obtain renderable data in the form of artificial reality content 22. In other examples, image capture devices 14 may capture facial images of people within the FoV of HMD 12 (using outward-facing camera hardware) and/or facial images or retina scans of user 24 (using inward-facing camera hardware), and may invoke encryption engine 2 to encrypt the image or scan data. In these examples, HMD 12 may transmit the encrypted data to another device, such as to peripheral device 42 using short-range communication infrastructure, or to a remote or cloud-based system, using a direct connection to network 18.

Figure 3C:
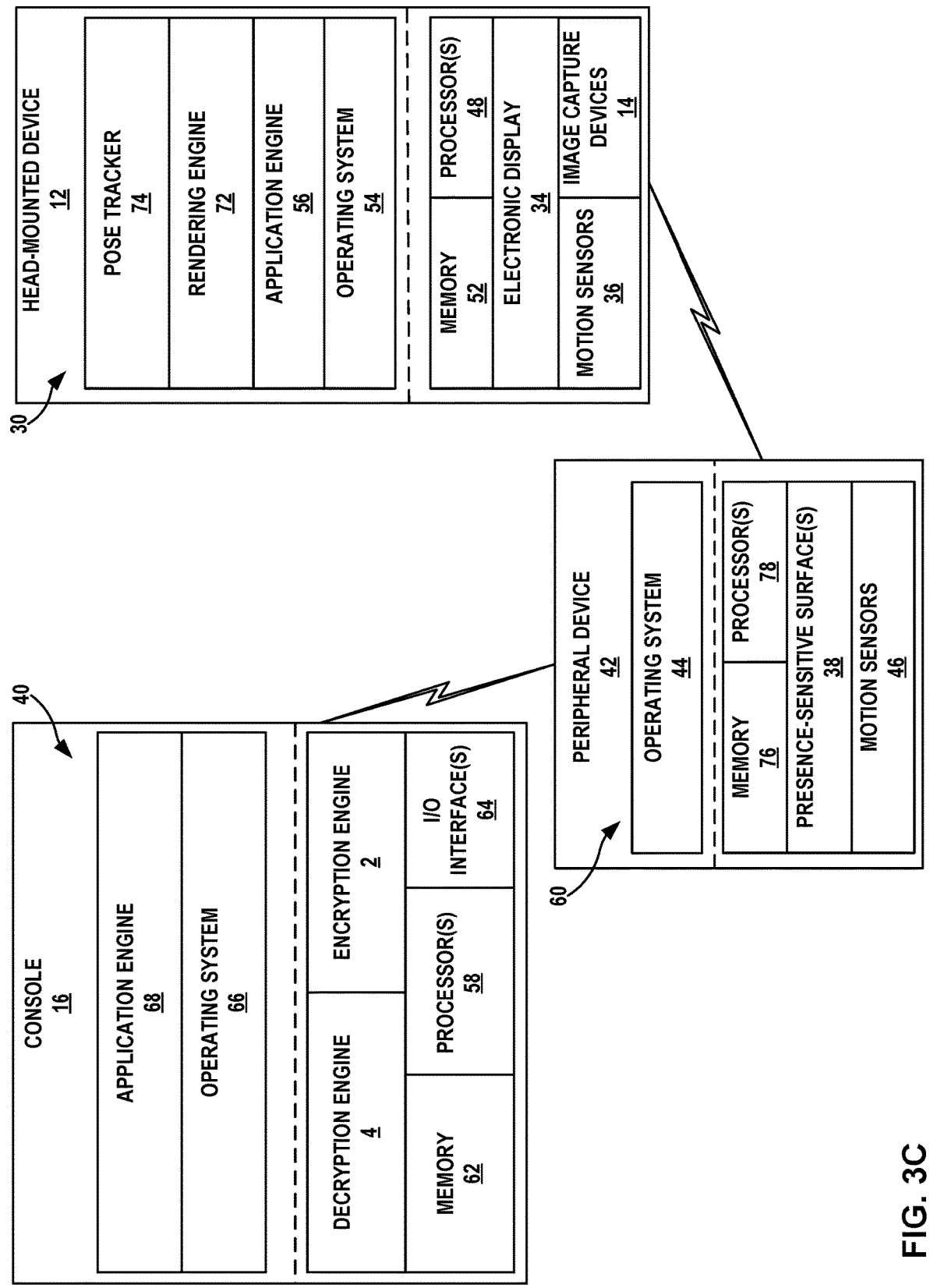

FIG. 3C is a block diagram depicting an example in which HMD 12 communicates with console 16 via peripheral device 42 shown in FIG. 2C. In the example of FIG. 3C, console 16 includes encryption engine 2 and decryption engine 4 configured to implement the hybrid masking scheme of this disclosure to thwart CPAs (as in the example of FIG. 3A). In the example of FIG. 3C, peripheral device 42 may offload portions of the computing tasks otherwise performed by HMD 12, thereby enabling a reduced hardware infrastructure and therefore a lower-profile form factor with respect to the design of HMD 12. While encryption engine 2 and decryption engine 4 are illustrated as being incorporated into console 16 in FIG. 3C for ease of illustration, it will be appreciated that HMD 12, peripheral device 42, and console 16 may communicate between each other using crypto packets, and therefore, each of HMD 12, peripheral device 42, and console 16 may implement encryption and decryption capabilities.

Peripheral device 42 includes motion sensors 46, presence-sensitive surface(s) 38 (which represent an example of surface 38 shown in FIG. 2C), memory 76, and one or more processors 78. Memory 76 and processor(s) 78 may collectively form control unit 32 illustrated in FIG. 2C. Software components 60 of peripheral device 42 include operating system 44, which provides a multitasking operating environment for software execution at peripheral device 42.

Figure 3D:
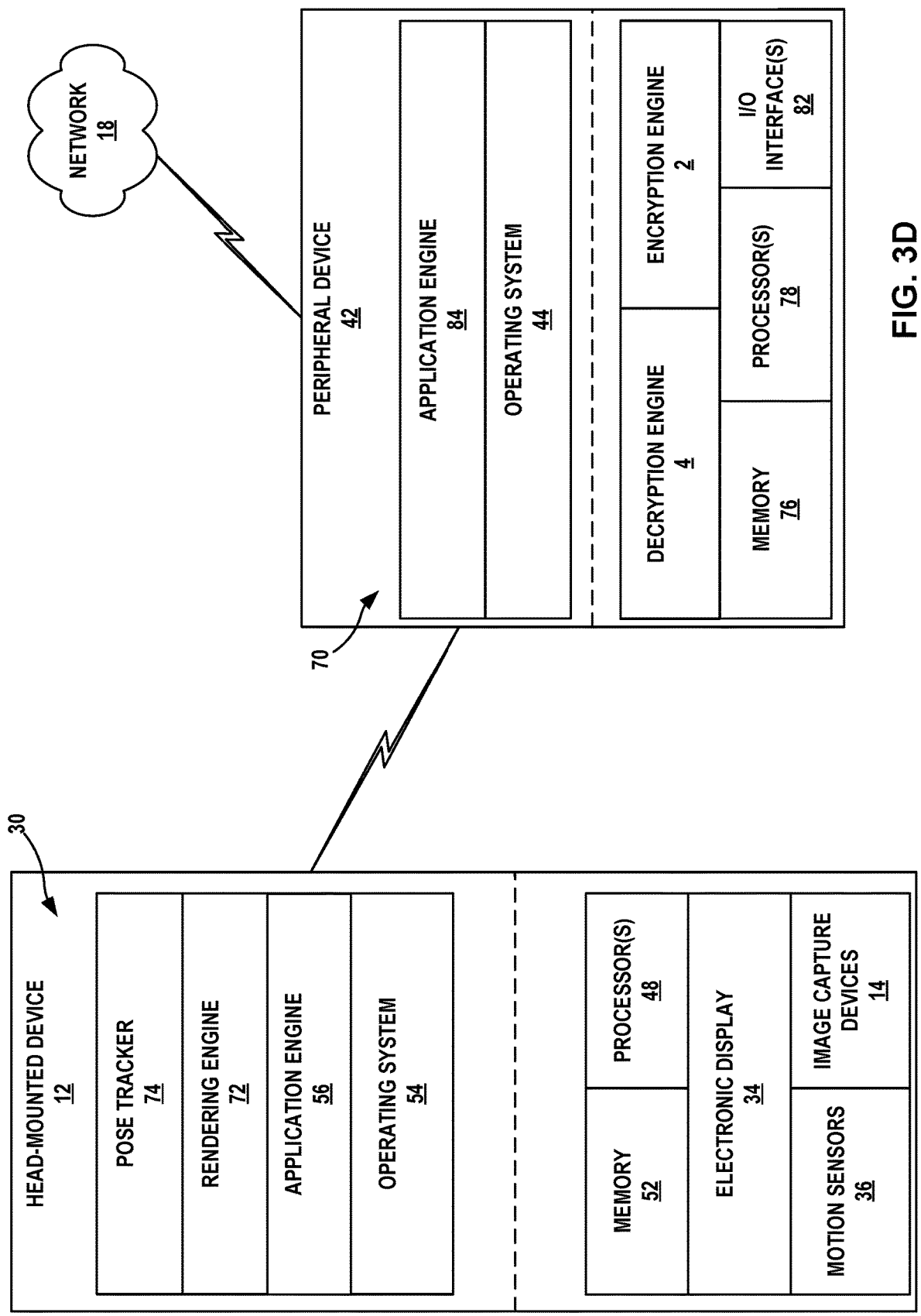

FIG. 3D is a block diagram depicting an example in which peripheral device 42 is equipped to perform the SCA-resistant encryption and SCA-resistant decryption techniques of this disclosure. In the example of FIG. 3D, peripheral device 42 includes the components illustrated in FIG. 3C, and also includes one or more I/O interfaces 82. I/O interface(s) may include presence-sensitive surface(s) 44 of FIG. 3C, in addition to other input and/or output devices and/or network interfaces.

In the example FIG. 3D, software components 70 of peripheral device 42 include application engine 84. Application engine 84 enables user 24 to view and interact with artificial reality content 22 for various end uses, such as for professional training, education, navigation, and the like. In the example illustrated in FIG. 3D, software components 70 of peripheral device 42 include operating system 44 and application engine 84. Software applications 40 of HMD 12 include operating system 54, application engine 56, rendering engine 72, and pose tracker 74.

In the example of FIG. 3D, peripheral device 42 includes encryption engine 2 and decryption engine 4. Peripheral device 42 may invoke decryption engine 4 in various use case scenarios, in response to varying stimuli. As one example, peripheral device 42 may invoke decryption engine 4 in response to receiving encrypted content (e.g. streaming video or gaming content) over network 18. In this example, peripheral device 42 may cause decryption engine 4 to decrypt the encrypted content received over network 18, and may cause rendering engine 72 to render the decrypted content to be output via electronic display 34 of HMD 12.

As another example, peripheral device 42 may invoke decryption engine 4 in response to receiving encrypted content (e.g. a facial image or an iris scan) in a crypto packet flow originating from HMD 12. In this example, peripheral device 42 may use the decrypted content for user authentication of user 24 or for facial recognition of other individuals positioned within the FoV of HMD 12. Peripheral device 42 may invoke encryption engine 2 in various use case scenarios, in response to varying stimuli, such as to encrypt raw input data before sending the encrypted content to HMD 12 in a crypto packet flow. In some examples, peripheral device 42 may invoke one or more I/O interfaces 82 to transmit secure cipher text over network 18.

In the examples of FIGS. 3A-3D, encryption engine 2 and decryption engine 4 implement the hybrid masking technique of this disclosure to conceal the actual ingress, intermediate, and egress data being processed during encryption and decryption operations. The encryption and decryption pipelines exhibit different power profiles when processing different datasets. That is, encryption engine 2 and decryption engine 4 exhibit different power profiles during runtime than would be exhibited if the pipelined encryption and decryption processes were performed without the obfuscation added by the hybrid masking scheme of this disclosure. In this way, encryption engine 2 and decryption engine 4 obfuscate the power trace information that SCA analyzers 6 and 8 obtain to perform pre-processing steps upon which the remainder of the CPA processes are based.

According to the configurations of this disclosure, each of encryption engine 2 and decryption engine 4 co-optimizes two different masking methodologies by applying each individual masking methodology to the data being processed just prior to the data entering a computational stage of the encryption/decryption pipeline for which the particular masking methodology is well suited. A masking methodology is considered well suited to a computational stage if the mask can be applied to the input data, and can be removed from the output data of the computational stage with low resource overhead.

Boolean masks, which are random numbers that are added to input data using exclusive-or (EXOR) logic, are particularly well suited to computational stages that perform addition logic (e.g., using adder units). This is because the Boolean mask can be removed from the output data to expose the true output by adding the same Boolean mask to the masked output. Multiplicative masks, which are random numbers that are multiplied with the input data using multiplier logic, are particularly well suited to computational stages that perform inversion logic (e.g., using inversion units). This is because the multiplicative mask can be removed from the output data to expose the true output by multiplying the inverse (reciprocal) of the multiplicative mask with the masked output. However, applying a Boolean mask to input data before feeding the data to inversion logic or applying a multiplicative mask to input data before feeding the data to additive logic renders the actual output data unrecoverable or difficult to recover. As such, the Boolean masking methodology is not well suited to inversion logic-based computational stages, and the multiplicative masking methodology is not well suited to additive logic-based computational stages.

The AES encryption and decryption pipelines incorporate different types of combinatorial logic gates (and in some instances, different combinations therebetween) at various computational stages. As such, using a single masking methodology throughout an AES pipeline renders underlying data unrecoverable or difficult to recover, because the masking methodology is not well suited to the particular combinatorial logic profile of every computational stage of the pipeline. However, applying the single masking methodology before computational stages to which it is well suited and removing the mask before feeding data into computational stages to which it is not well suited exposes unmasked data to SCA analyzers 6 and 8 at particular stages of the AES pipeline, exposing an attack surface that can be exploited.

According to aspects of this disclosure, encryption engine 2 and decryption engine 4 are configured to apply a Boolean mask to input data, based on Boolean masking's suitability to the initial stages of the AES encryption and decryption pipelines. Encryption engine 2 and decryption engine 4 are configured to seamlessly replace the Boolean mask with a multiplicative mask before intermediate data enters computational stages to which multiplicative masking is better suited. Additionally, encryption engine 2 and decryption engine 4 are configured to seamlessly replace the multiplicative mask with a Boolean mask before the data enters any subsequent computational stages to which Boolean masking is better suited. The new mask is applied first, and the old mask is subsequently removed, such that the original unmasked data is never exposed in the encryption datapath or decryption datapath, as the case may be.

Based on the hybrid masking scheme implemented by encryption engine 2 and decryption engine 4, data ingresses and egresses the encryption and decryption pipelines in Boolean masked form, and remains masked at all times during encryption and decryption, thereby entirely concealing the attack surface that would otherwise be exposed to SCA analyzers 6 and 8. Moreover, encryption engine 2 and decryption engine 4 implement the seamless switching mechanism to switch between Boolean and multiplicative masks in digital logic, thereby mitigating the overhead cost that would be introduced by conversion circuits that convert masks between Boolean and multiplicative formats.

By maintaining the masked status of all data passing through the encryption and decryption pipelines, encryption engine 2 and decryption engine 4 decorrelate the power trace signature output by HMD 12 (or peripheral device 42 or console 16) from the actual data undergoing encryption/decryption. That is, the power trace signature output by the device that includes encryption engine 2 and decryption engine 4 reflects encryption/decryption of the masked data, and not the underlying unmasked data. However, SCA analyzers 6 and 8 do not have access to the Boolean and multiplicative masks applied by encryption engine 2 and decryption engine 4, and also do not have access to the hybrid masking scheme according to which encryption engine 2 and decryption engine 4 apply the Boolean and multiplicative masks during encryption/decryption. In this way, encryption engine 2 and decryption engine 4 implement the hybrid masking techniques of this disclosure to exhibit misleading power traces, thereby mangling the data that SCA analyzers 6 and 8 attempt to align as a preprocessing step that is essential to executing a CPA successfully.

Figure 4:
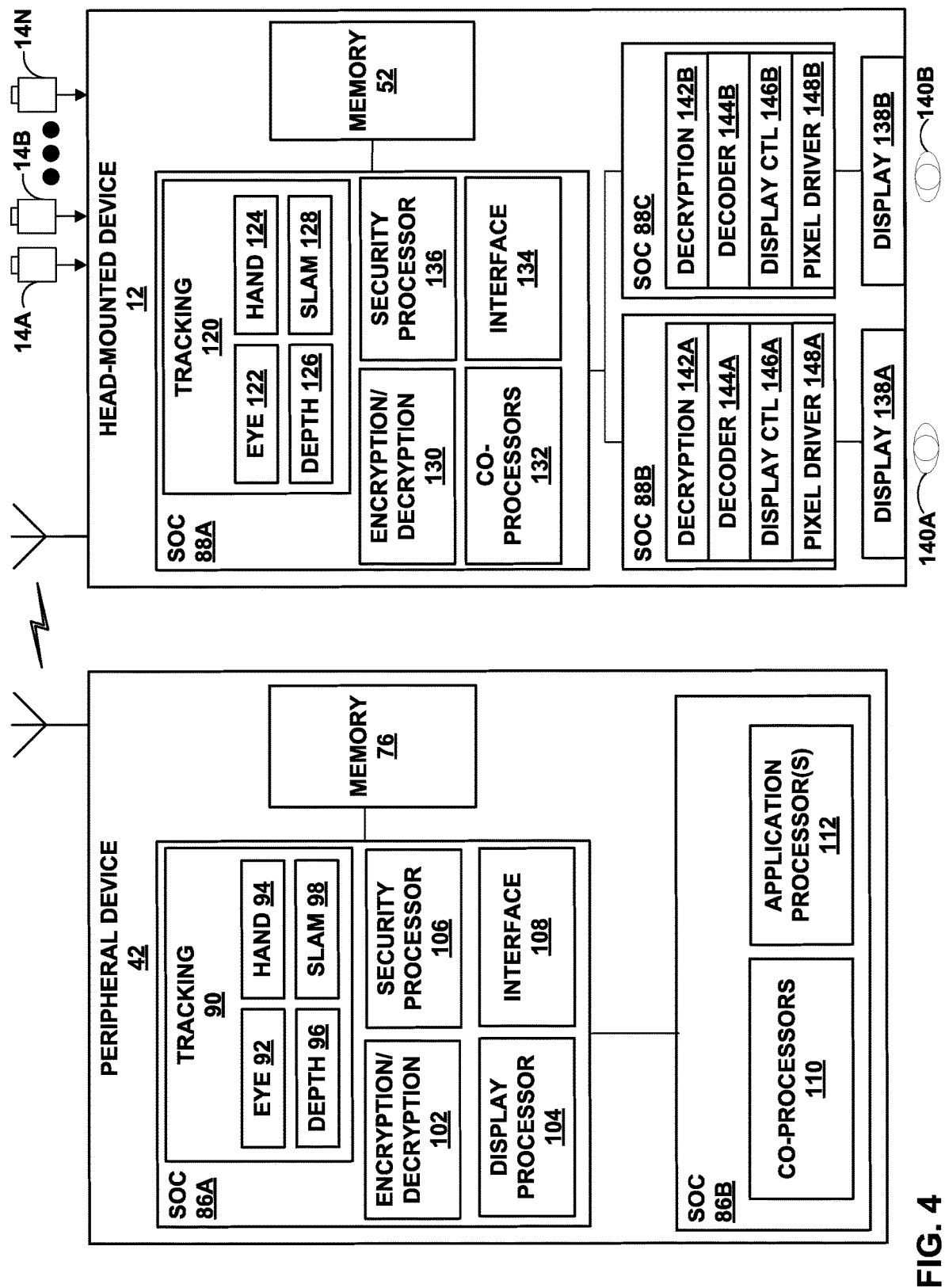
FIG. 4 is a block diagram illustrating a more detailed example implementation of a distributed architecture for a multi-device artificial reality system in which one or more devices are implemented using one or more system on a chip (SoC) integrated circuits within each device.

FIG. 4 is a block diagram illustrating a more detailed example implementation of a distributed architecture for a multi-device artificial reality system in which one or more devices are implemented using one or more SoC integrated circuits within each device. In some examples, artificial reality system 10 and/or artificial reality system 20 may include peripheral device 42 operating in conjunction with HMD 12, as described above with respect to FIGS. 2C, 3C, and 3D. Again, peripheral device 42 represents a physical, real-world device having a surface on which the artificial reality systems 10 or 20 overlay virtual content. Peripheral device 42 may include one or more presence-sensitive surfaces for detecting user inputs by detecting a presence of one or more objects (e.g., fingers, stylus) touching or hovering over locations of the presence-sensitive surface (e.g., presence-sensitive surface(s) 38).

In some examples, peripheral device 42 may include an output display, which may be a presence-sensitive display. In some examples, peripheral device 42 may be or have a form factor similar to a smartphone, a tablet computer, a personal digital assistant (PDA), or other handheld device. In some examples, peripheral device 42 may be a smartwatch, smartring, or other wearable device. Peripheral device 42 may also be part of a kiosk or other stationary or mobile system. Peripheral device 42 may or may not include a display device for outputting content to a screen. As described, HMD 12 is architected and configured to enable concurrent execution of multiple artificial reality applications and collaborative scene rendering in accordance with techniques described in this disclosure.

In general, the SoCs illustrated in FIG. 4 represent a collection of specialized integrated circuits arranged in a distributed architecture, where each SoC integrated circuit includes various specialized functional blocks configured to provide an operating environment for artificial reality applications. FIG. 4 is merely one example arrangement of SoC integrated circuits. The distributed architecture for a multi-device artificial reality system may include any collection and/or arrangement of SoC integrated circuits.

In this example, SoC 88A of HMD 12 comprises functional blocks including tracking 120, an encryption/decryption unit 130, co-processors 132, security processor 136, and an interface 134. Encryption/decryption unit 130 may include encryption and decryption engines implemented separately in silicon. Tracking 120 provides a functional block for eye tracking 122 ("eye 122"), hand tracking 124 ("hand 124"), depth tracking 126 ("depth 126"), and/or Simultaneous Localization and Mapping (SLAM) 128 ("SLAM 128").

For example, HMD 12 may receive input from one or more accelerometers (e.g., quantities represented in inertial measurement units or "IMUs") that output data indicative of current acceleration of HMD 12, GPS sensors that output data indicative of a location of HMD 12, radar or sonar that output data indicative of distances of HMD 12 from various objects, or other sensors that provide indications of a location or orientation of HMD 12 or other objects within a physical environment. HMD 12 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 42 and/or hand and/or the eyes of user 24) in the physical environment that are within a field of view of image capture devices, which typically corresponds with the viewing perspective of HMD 12 or the inward-facing view of HMD 12. Based on a portion of the sensed data and/or a portion of the image data, tracking 120 determines, for example, a current pose for the frame of reference of HMD 12 and, in accordance with the current pose, renders the artificial reality content.

Encryption/decryption unit 130 is a functional block to encrypt outgoing data communicated to peripheral device 42 or security processor 136 and decrypt incoming data communicated from peripheral device 42 or other system. Encryption/decryption unit 130 may include an encryption engine and a decryption engine implemented separately in silicon. In examples in which encryption/decryption unit 130 of HMD 12 includes encryption engine 2 and decryption engine 4, encryption/decryption unit 102 of peripheral device 42 includes an encryption engine and a decryption engine separate from encryption engine 2 and decryption engine 4.

Application co-processors 132 includes various processors such as a video processing unit, graphics processing unit, digital signal processors, encoders and/or decoders, and/or others. In accordance with the techniques described in this disclosure, all or portions of a backend shell may be in hardware, software, or a combination of hardware and software. For example, the backend shell of a concurrent application engine may be executed on application co-processors 132. A plurality of artificial reality applications may be concurrently executed on application co-processors 132.

Security processor 136 provides secure device attestation and mutual authentication of HMD 12 when pairing with devices, e.g., peripheral device 42, used in conjunction within the AR environment. Security processor 136 may authenticate SoCs 88A-88C of HMD 12. Interface 134 is a functional block that includes one or more interfaces for connecting to functional blocks of SoC 88A. As one example, interface 134 may include peripheral component interconnect express (PCIe) slots. SoC 88A may connect with SoC 88B, 88C using interface 134. SoC 88A may connect with a communication device (e.g., radio transmitter) using interface 134 for communicating with other devices, e.g., peripheral device 42.

SoCs 88B and 88C each represent display controllers for outputting artificial reality content on respective displays, e.g., displays 138A, 138B (collectively, "displays 138"). In this example, SoC 88B may include a display controller for display 613A to output artificial reality content for a left eye 140A of user 24. For example, SoC 88B includes a decryption block 142A, decoder block 144A, display controller 146A, and/or a pixel driver 148A for outputting artificial reality content on display 138A. Similarly, SoC 88C may include a display controller for display 613B to output artificial reality content for a right eye 140B of user 24. For example, SoC 88C includes decryption unit 142B, decoder 144B, display controller 146B, and/or a pixel driver 148B for generating and outputting artificial reality content on display 138B. Displays 138 may include light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality content 22.

Peripheral device 42 includes SoCs 86A and 86B configured to support an artificial reality application. In this example, SoC 86A comprises functional blocks including tracking 90, an encryption/decryption unit 102, a display processor 104, an interface 108, and security processor 106. Tracking 90 is a functional block providing eye tracking 92 ("eye 92"), hand tracking 94 ("hand 94"), depth tracking 96 ("depth 96"), and/or simultaneous localization and mapping (SLAM) 98 ("SLAM 98"). For example, peripheral device 42 may receive input from one or more accelerometers (quantified in IMUs) that output data indicative of current acceleration of peripheral device 42, GPS sensors that output data indicative of a location of peripheral device 42, radar or sonar that output data indicative of distances of peripheral device 42 from various objects, or other sensors that provide indications of a location or orientation of peripheral device 42 or other objects within a physical environment. Peripheral device 42 may in some examples also receive image data from one or more image capture devices, such as still cameras, video cameras, laser scanners, Doppler® radar scanners, depth scanners, or the like, configured to output image data representative of the physical environment. Based on the sensed data and/or image data, tracking block 90 determines, for example, a current pose for the frame of reference of peripheral device 42 and, in accordance with the current pose, renders the artificial reality content to HMD 12.

Encryption/decryption unit 102 encrypts outgoing data communicated to HMD 12 or security processor 106 and decrypts incoming data communicated from HMD 12 or security processor 106. Encryption/decryption unit 102 may include an encryption engine and decryption engine implemented separately in silicon. Encryption/decryption unit 102 may support symmetric key cryptography to encrypt/decrypt data using a session key (e.g., secret symmetric key). Display processor 104 includes one or more processors such as a video processing unit, graphics processing unit, encoders and/or decoders, and/or others, for rendering artificial reality content to HMD 12.

Interface 108 includes one or more interfaces for connecting to functional blocks of SoC 510A. As one example, interface 134 may include peripheral component interconnect express (PCIe) slots. SoC 86A may connect with SoC 86B using interface 134. SoC 86A may connect with one or more communication devices (e.g., radio transmitter) using interface 134 for communicating with other devices, e.g., HMD 12. Security processor 106 provides secure device attestation and mutual authentication of peripheral device 42 when pairing with devices, e.g., HMD 12, used in conjunction within the AR environment. Security processor 106 may authenticate SoCs 86A, 86B of peripheral device 42.

SoC 86B includes application co-processors 110 and application processors 112. In this example, application co-processors 110 includes various processors, such as a vision processing unit (VPU), a graphics processing unit (GPU), and/or central processing unit (CPU). Application processors 112 may include a processing unit for executing one or more artificial reality applications to generate and render, for example, a virtual user interface to a surface of peripheral device 42 and/or to detect gestures performed by a user with respect to peripheral device 42.

Figure 5:
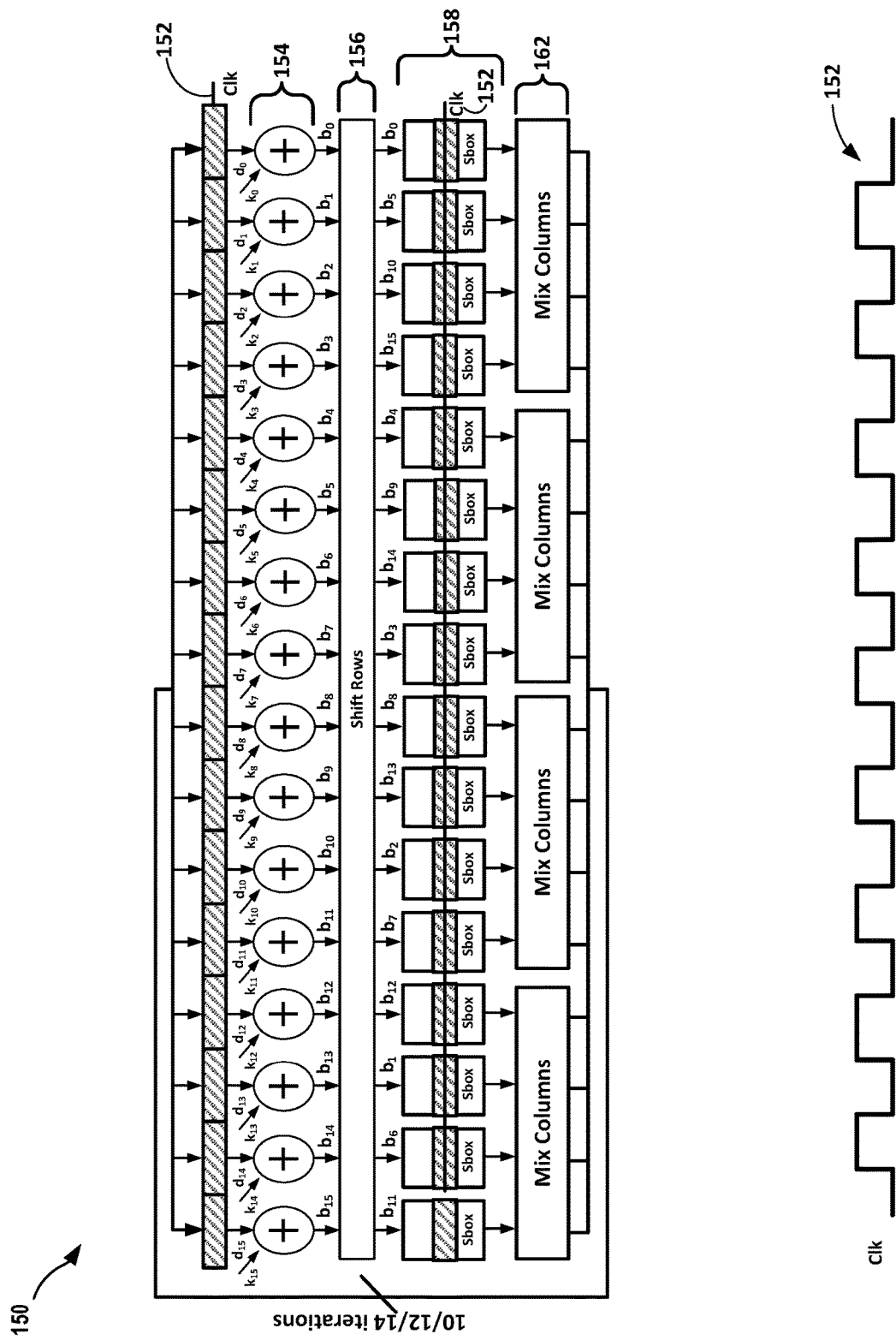
FIG. 5 is a conceptual diagram illustrating an example of an AES-compliant encryption or decryption datapath.

FIG. 5 is a conceptual diagram illustrating an example of an AES-compliant encryption or decryption datapath. The process and structure illustrated in FIG. 5 is referred to herein as AES round datapath 150. An AES-compliant encryption engine may implement AES round datapath 150 to decrypt an input block of cipher text, by performing inverse operations with respect to a reciprocal encryption datapath that generates cipher text from unencrypted input data. Various aspects of AES round datapath 150 operate according to master clock 152. The clock rate of master clock 152 is described as being at a "full frequency" in the implementation illustrated in FIG. 5 to provide maximum decryption throughput with respect to AES round datapath 150. According to AES round datapath 150, a 16-byte (128-bit) encrypted input is provided, on a per-byte basis, to sixteen adder units as part of "add round key" step 154. In add round key step 154, each byte of the data input is added to an inverse cipher key obtained using Rijndael's key schedule. Each input byte-key pair is shown in FIG. 5 using a "d-k" notation, using subscripts to delineate the different input bytes and the different inverse cipher keys.

The sixteen output bytes (denoted using a "b" notation with unique subscripts) of add round key step 154 are then shifted cyclically by various offsets in a shift rows step 156. The shift rows step 156 cyclically shifts the bytes in each row by a certain offset determined for that particular row. In the shift rows step 156, the first row is left unchanged, each byte of the second row is right-shifted by an offset of one, each byte of the third row is right-shifted by an offset of two, and each byte of the fourth row is right-shifted by an offset of three. Thus, each column of the output data from shift rows step 156 includes shifted data from a column of the input data. The right-shifting operations described with respect to shift rows step 156 are generally reciprocal to left-shifting operations that are performed by a reciprocal AES-compliant encryption datapath.

The structure of the data output by the shift rows step 156 does not permit for independently operating on separate segments of the original 16-byte input, because data produced from four different block ciphers may be included in each four-byte run of the data output by the shift rows step 156. The shift rows step 156 is an iterative process that is performed in multiple passes, which, in the particular example of FIG. 5, is a ten-iteration step.

Each respective output byte of the shift rows step 156 is then passed through a respective inverse substitute byte (inverse Sbox) unit as part of inverse byte substitution computational stage 158. AES round datapath 150 implements inverse byte substitution computational stage 158 by inverting a lookup table (LUT)-based substitution as a deciphering operation performed on the encrypted input data. In the reciprocal byte substitution step of an encryption datapath, each byte in the array output by a shift rows step is replaced with a substitute byte obtained using a LUT, which is also sometimes referred to as an 8-bit substitution box. Inverse byte substitution computational stage 158 addresses non-linearity in the cipher code received as input for AES round datapath 150.

The byte-substituted outputs of the sixteen inverse Sbox units are then provided to an array of mix columns units for performance of mix columns step 162. AES round datapath 150 includes four mix columns units, each of which receives, as input, the outputs of four contiguous inverse Sbox units. As such, each mix columns unit processes a four-byte input as part of mix columns step 162. In mix columns step 162, each mix columns unit combines the respective four-byte input using an invertible linear transformation. Each mix columns unit receives a four-byte input, and produces a four-byte output. Each four-byte input received by a respective mix columns unit is sometimes referred to as a respective "column" in the context of during mix columns step 162. Each mix columns unit of AES round datapath 150 processes the respective input column using matrix multiplication such that every single input byte affects all four output bytes. In a reciprocal encryption process, the combination of the reciprocal shift rows step and mix columns step provides diffusion in the cipher operation set.

An encryption datapath corresponding to AES round datapath 150 accepts a 16-byte (128-bit) block of unencrypted data, and adds cipher key segments (the cipher key being obtained using Rijndael's key schedule) to the unencrypted input, on a byte-by-byte basis during the corresponding "add round key" step. In a corresponding Sbox stage, the encryption datapath employs Sbox units, instead of inverse Sbox units described with respect to the decryption operations of AES round datapath 150. Purely for the sake of brevity, a separate AES encryption datapath is not illustrated in the accompanying drawings, in light of the structural parallels between the AES-compliant encryption datapath and the decryption-based AES round datapath 150 of FIG. 5.

Figure 6:
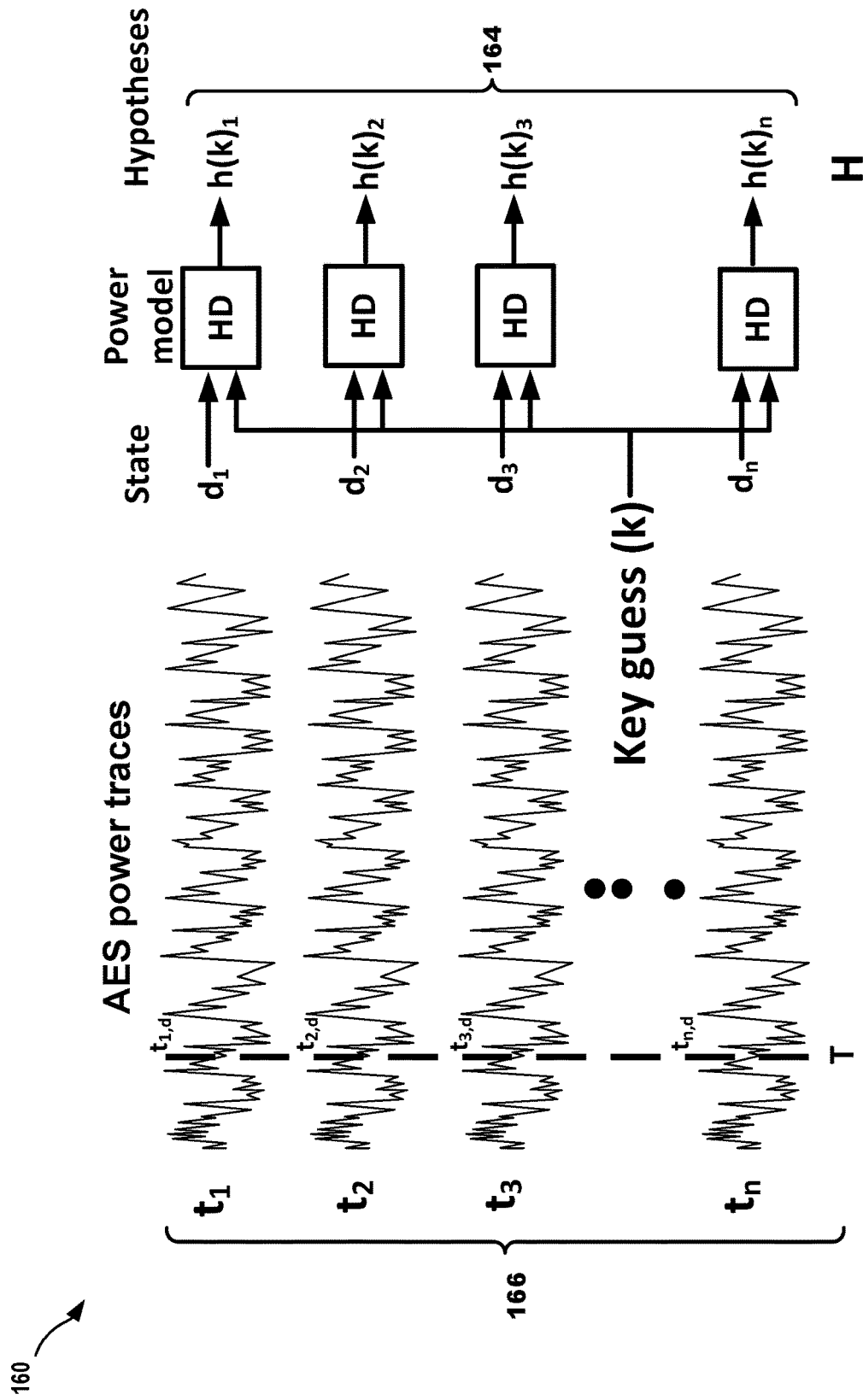
FIG. 6 is a conceptual diagram illustrating aspects of a correlation power attack (CPA).

FIG. 6 is a conceptual diagram illustrating aspects of a correlation power attack (CPA) 160. CPA 160 represents an attack that SCA analyzer 6 or SCA analyzer 8 may perform. CPA 160 is described as an attack that SCA analyzer 8 performs with respect to decryption engine 4, as a non-limiting example. SCA analyzer 6 may also perform CPA 160 with respect to encryption engine 2. SCA analyzer 8 may provide a number of sixteen-byte test inputs to decryption engine 4, and snoop on the power traces exhibited by the device (e.g., HMD 12 or console 16) that implements decryption engine 4 while decrypting the test inputs. For example, SCA analyzer 8 may provide one million test vectors in carrying out CPA 160.

SCA analyzer 8 maintains timestamps for the input times of the various test inputs to decryption engine 4. The timestamps that SCA analyzer 8 maintains for the full set of test inputs is illustrated in FIG. 6 as $t_1$ through $t_n$, where the subscript 'n' denotes the overall number of text inputs provided by SCA analyzer 8 (which is a value of one million in the case of many common SCA models). The underlying datasets of the respective test inputs are illustrated in FIG. 6 as $d_1$ through $d_n$. Using the respective timestamp t and the respective dataset d of a particular test input, SCA analyzer 8 conducts AES power traces 166. Again, because the AES is a publicly-available standard, potential hackers can configure SCA analyzer 8 to predict, for known input data, the expected power trace information relatively accurately.

Using datasets $d_1$ through $d_n$, SCA analyzer 8 generates key hypotheses $h(k)_1$ through $h(k)_n$ (collectively, hypotheses 164). That is, SCA analyzer 8 feeds datasets $d_1$ through $d_n$ into a key generation model. In the example of CPA 160, SCA analyzer 8 uses a hardware distance (HD) model to generate hypotheses 164 from datasets $d_1$ through $d_n$. SCA analyzer 8 also skims power traces 166 while each respective dataset d is processed by decryption engine 4. Because the data of each dataset d and the input time t of each dataset d is known to SCA analyzer 8, SCA analyzer 8 can match or determine likenesses between each AES power trace 166 and each of the 256 (calculated as 2^8 based on the 8-bit input) possible hypotheses 164.

The overall convergence of test inputs is denoted as 'T' in FIG. 6, and the overall convergence of hypotheses 164 is denoted as 'H'. SCA analyzer 8 uses the correlation of T and H (denoted as correlation (T, H)) to predict the inverse cipher key being applied in an AES-defined decryption process. In terms of key prediction, the particular hypothesis 164 that yields the highest correlation (T, H) value tends to be correct key guess in terms of the inverse cipher key being applied in the decryption process. In some notations, the correlation (T, H) value is expressed as a prediction operation R(k), and the correct key guess of the inverse cipher key is the greatest R(k) value obtained from the iterative power trace-to-predicted key comparison operation. That is, the particular hypothesis 164 that maximizes the value of R(k) within the universe of AES power traces 166 tends to be the correct key guess with respect to the AES-decryption process illustrated in FIG. 5 by way of AES round datapath 150.

Figure 7:
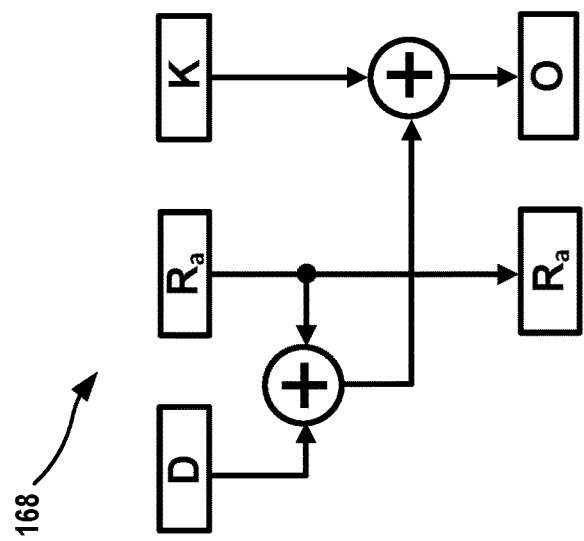
FIG. 7 is a block diagram illustrating an example of Boolean masking as applied within an add round key of FIG. 5, in accordance with aspects of this disclosure.

FIG. 7 is a block diagram illustrating an example of Boolean masking as applied within add round key step 154 of FIG. 5, in accordance with aspects of this disclosure. In Boolean masked round key addition step 168 of FIG. 7, the input data is denoted by 'D' and the round key segment being added in the current round is denoted by 'K'. The Boolean mask is denoted by '$R_a$' to illustrate that the Boolean mask is a random number. In the example of FIG. 7, the input data D is first added to the Boolean mask $R_a$, based on the additive facet of Boolean masking. The masked data is then mingled with the round key segment as part of add round key step 154, to form a masked output 'O'. The Boolean mask $R_a$ is also output from add round key step 154, because masked output O can be unmasked by adding $R_a$ to masked output O. in the case of add round key step 154, D represents a segment of cipher text, while D represents plain text data in the case of a corresponding encryption datapath.

Figure 8:
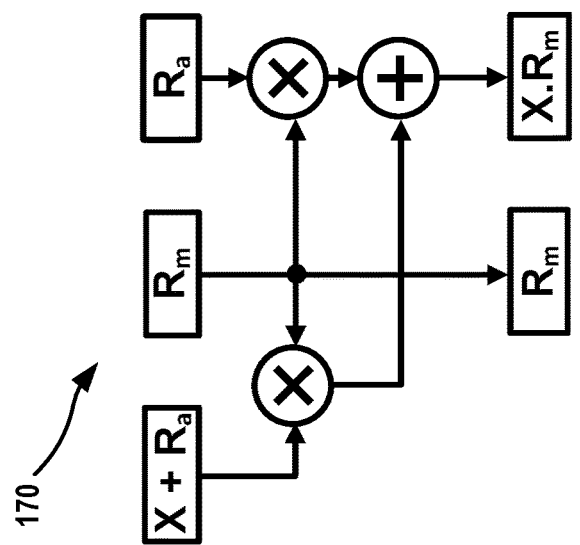
FIG. 8 is a block diagram illustrating an example of Boolean mask-to-multiplicative mask translation according to aspects of this disclosure.

FIG. 8 is a block diagram illustrating an example of Boolean mask-to-multiplicative mask translation according to aspects of this disclosure. Encryption engine 2 and decryption engine 4 may apply mask translation logic 170 of FIG. 8 to Boolean-masked input data, to produce multiplicatively masked output data. The Boolean-masked input data to mask translation logic 170 is denoted in FIG. 8 as "X+$R_a$." Encryption engine 2 and decryption engine 4 apply mask translation logic 170 to replace the Boolean mask $R_a$ with a multiplicative mask denoted as "$R_m$" in FIG. 8. That is, mask translation logic 170 receives "X+$R_a$" as an input parameter, and produces "X.$R_m$" as an output. Encryption engine 2 and decryption engine 4 apply mask translation logic 170 in a multistage process, with two or more steps parallelized in some runtime scenarios.

Encryption engine 2 and decryption engine 4 multiply the input "X+$R_a$" by multiplicative mask $R_m$. Encryption engine 2 and decryption engine 4 also multiply Boolean mask $R_a$ by multiplicative mask $R_m$. In turn, encryption engine 2 and decryption engine 4 add the two products produced by the two multiplication steps to produce a sum "X.$R_m$." As another output of mask translation logic 170, encryption engine 2 and decryption engine 4 output multiplicative mask $R_m$ to enable downstream computational logic to later remove multiplicative mask $R_m$. As described below in greater detail with respect to FIG. 11, encryption engine 2 and decryption engine 4 are configured to apply one or more instances of mask translation logic 170 to intermediate data that traverses from round key addition to Sbox or inverse Sbox logic.

Figure 9:
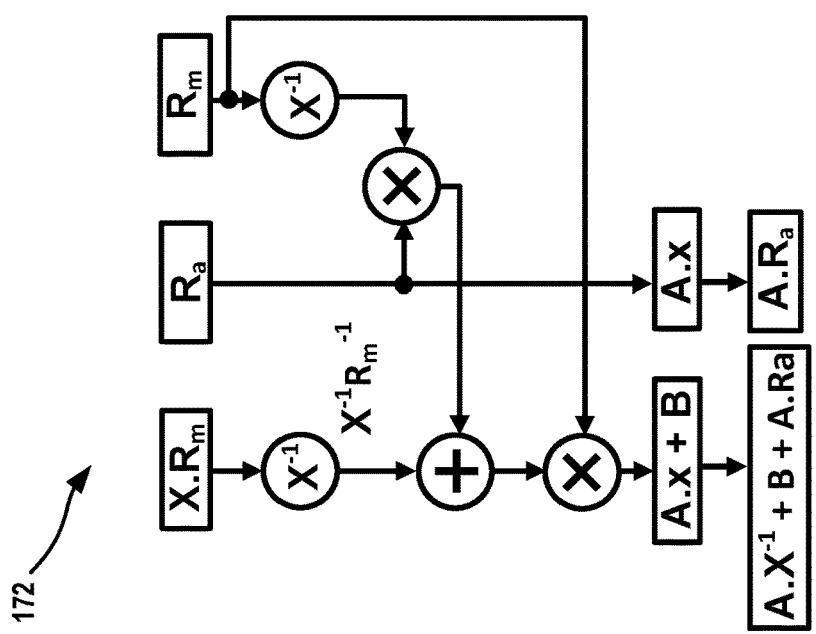
FIG. 9 is a block diagram illustrating one example implementation of mask-switching inverse byte substitution logic of this disclosure.

FIG. 9 is a block diagram illustrating one example implementation of mask-switching inverse Sbox logic of this disclosure. FIG. 9 is described with respect to an AES decryption pipeline as an example, although it will be appreciated that encryption engine 2 is also configured to perform corresponding mask-switching functionalities at the Sbox stage of the encryption pipeline, in accordance with this disclosure. Decryption engine 4 invokes mask-switching inverse Sbox logic 172 of FIG. 9 to perform inverse byte substitution in compliance with AES decryption, while seamlessly reversing the results of mask translation logic 170.

Mask-switching inverse Sbox logic 172 receives, as decryption input, multiplicatively masked intermediate data denoted by "X.$R_m$." Decryption engine 4 passes the multiplicatively masked intermediate data X.$R_m$ through an inverter logic gate, which performs one of the critical operations of the logic of a single inverse Sbox unit of inverse byte substitution computational stage 158. Again, multiplicative masking is well suited to logic that includes an inversion operation as a critical step. The inverter unit produces a multiplicatively masked output denoted by "$X^{-1}.R_m^{-1}$."

According to the configurations of this disclosure, mask-switching inverse Sbox logic 172 also includes mask-switching logic that seamlessly converts multiplicatively masked data to Boolean masked data, without exposing any unmasked data at any intermediate stage. Using the mask-switching logic of mask-switching inverse Sbox logic 172, decryption engine 4 passes the originally applied multiplicative mask $R_m$ through an inverter unit to produce an inverse multiplicative mask $R_m^{-1}$. In turn, decryption engine 4 passes the inverse multiplicative mask $R_m^{-1}$ and a Boolean mask $R_a$ through a multiplier unit to form a product denoted by $R_m^{-1}.R_a$.

Decryption engine 4 adds the product $R_m^{-1}.R_a$ to the inverse of the multiplicatively masked input $X^{-1}.R_m^{-1}$ using an adder unit, and multiplies the resulting sum with the originally applied multiplicative mask $R_m$. The resulting output, with modifications introduced by standard inverse Sbox logic is denoted as "A.x+B" in which 'A' and 'B' represent values (e.g., 'A' represents a matrix) applied according to AES inverse Sbox logic. The Boolean mask $R_a$ is also multiplied with the product "A.x" to form the value "A.$R_a$." As shown in FIG. 9, the outputs of mask-switching inverse Sbox logic 172 are the expressions "A.$x^{-1}$+B+A.$R_a$" and "A.$R_a$."

The output expression "A.$x^{-1}$+B+A.$R_a$" represents a Boolean-masked version of the standard output of a single inverse Sbox unit included in inverse byte substitution computational stage 158 of AES round datapath 150. That is, the standard output of a single inverse Sbox unit in a single decryption iteration is represented by the expression "A.$x^{-1}$+B." Mask-switching inverse Sbox logic 172 receives multiplicatively masked input (X.$R^m$) and produces the Boolean-masked output "A.$x^{-1}$+B+A.$R_a$," where "A.$R_a$" represents a Boolean mask added to the standard inverse Sbox output represented by the expression "A.$x^{-1}$+B."

In this way, mask-switching inverse Sbox logic 172 effectively switches data from multiplicatively masked form to Boolean-masked form, while performing inverse Sbox functionalities in compliance with the AES, according to the techniques of this disclosure. Moreover, the data processed by mask-switching inverse Sbox logic 172 remains masked at all times, whether by a multiplicative mask or a Boolean mask, thereby concealing the attack surface of the data entirely.

Figure 10:
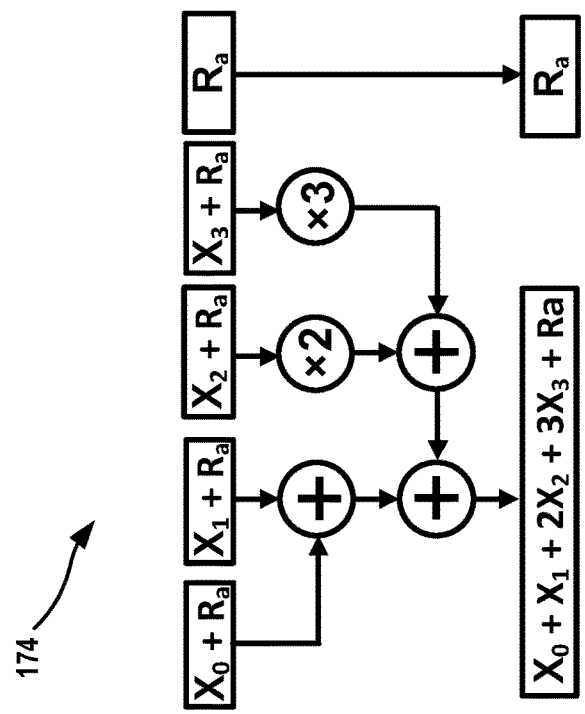
FIG. 10 is a block diagram illustrating one example of mask-aligning mix columns hardware logic of this disclosure.

FIG. 10 is a block diagram illustrating one example of mask-aligning mix columns hardware logic of this disclosure. FIG. 10 is also described with respect to an AES decryption pipeline as an example, although it will be appreciated that encryption engine 2 is also configured to perform corresponding mask-switching functionalities at the Sbox stage of the encryption pipeline, in accordance with this disclosure. Decryption engine 4 invokes mask-aligning mix columns logic 174 of FIG. 10 to process the Boolean-masked output of mask-switching inverse Sbox logic 172 in compliance with the AES-defined decryption pipeline, while maintaining Boolean-masked status of all intermediate data, and producing a Boolean-masked decrypted output.

Mask-switching inverse Sbox logic 172 of FIG. 9 produces a Boolean-masked four-byte output. More specifically, each discrete byte of the output of mask-switching inverse Sbox logic 172 is masked individually via EXOR-based addition to the same one-byte random number "$R_a$." As such, mask-aligning mix columns logic 174 accepts a four-byte input, with each byte being masked (in Boolean format) with the one-byte random number $R_a$. A generic input 'X' is shown in FIG. 10 as four Boolean-masked bytes, namely, "$X_0+R_a$," "$X_1+R_a$," "$X_2+R_a$," and "$X_3+R_a$."

Mask-aligning mix columns logic 174 leverages the cryptography principle by which addition of a bit sequence to itself an odd number of times produces the same bit sequence, while addition of the bit sequence to itself an even number of times produces a zero value. Applied to Boolean masking, this cryptography principle yields an unmasked output (i.e., the unmasked output added to zero) if the unmasked output is added iteratively to the Boolean mask an even number of times. Conversely, this cryptography principle yields a Boolean-masked output (i.e., the unmasked output added to the Boolean mask) if the unmasked output is added to the Boolean mask once or is added iteratively to the Boolean mask an odd number of times.

Mask-aligning mix columns logic 174 adds the two most significant bytes of the Boolean-masked input "$X_0+R_a$" and "$X_1+R_a$" to each other to obtain the sum "$X_0+X_1$" with the two instances of $R_a$ canceling out one another. Mask-aligning mix columns logic 174 doubles the third byte of the Boolean-masked input ($X_2+R_a$) to obtain the sum "$2X_2$" with the two instances of $R_a$ canceling out one another, and triples the fourth byte of the Boolean-masked input ($X_3+R_a$) to obtain the sum "$3X_3+R_a$" with the Boolean mask $R_a$ remaining intact because it was added to itself an odd number of times.

Mask-aligning mix columns logic 174 sums the resulting values listed above to produce the output "$X_0+X_1+2X_2+3X_3+R_a$." In this way, mask-aligning mix columns logic 174 produces a Boolean-masked four-byte output, while not leaving any four-byte intermediate data sequence unmasked during mix columns operation. Expressed in another way, the one-byte Boolean mask $R_a$ is added an odd number of times (seven times) during the execution of mask-aligning mix columns logic 174, because $R_a$ is added once with the first input byte $X_0$, once with the second byte $X_1$, twice with the third byte $X_2$, and thrice with the fourth byte $X_3$. Because the one-byte Boolean mask $R_a$ is added an odd number of iterations (seven), the output of mask-aligning mix columns logic 174 is Boolean-masked. $R_a$ represents a single byte of the four-byte mask of this disclosure.

Figure 11:
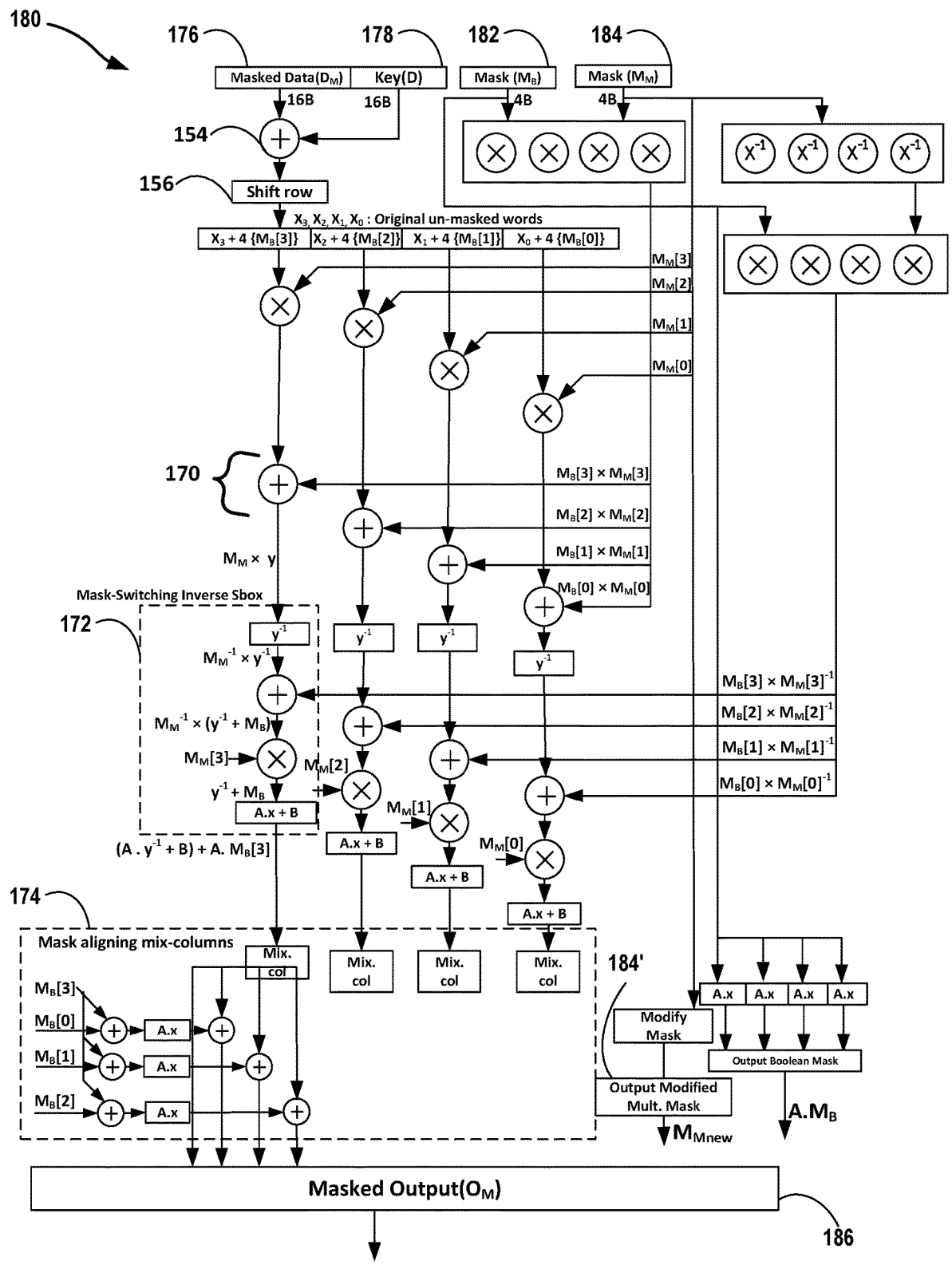
FIG. 11 illustrates one example hybrid-masked decryption datapath of this disclosure.

FIG. 11 illustrates one example hybrid-masked decryption datapath of this disclosure. Decryption engine 4 implements hybrid-masked decryption datapath 180 of FIG. 11 to maintain masked status of all ingress data, intermediate/interstitial data, and egress data while performing decryption in compliance with the AES. Encryption engine 2 may also use the hybrid masking scheme described with respect to hybrid-masked decryption datapath 180, but in the context of a corresponding encryption pipeline. While masking is a provably effective mechanism to prevent side-channel leakage of encryption keys, or decryption keys, naive implementations of multi-mode masking incur high power and logic overhead (>2× in some examples). Hybrid-masked decryption datapath 180 co-optimize two masking methodologies (Boolean masking and multiplicative masking) to reduce power and logic costs.

In this example, the decryption inputs to hybrid-masked decryption datapath 180 are Boolean-masked cipher text 176 and a decryption round key 178. The masking inputs to hybrid-masked decryption datapath 180 are Boolean mask 182 and multiplicative mask 184, which are both random bit sequences. Control logic operating decryption engine 4, such as control logic implemented by a security processor of processor(s) 48 or 78, applies Boolean mask 182 (a four-byte random bit sequence) to a sixteen-byte segment of unmasked cipher text 'D' in a shifted-row format expressed as follows: D[15:0]+{MB[3], MB[0], MB[1], MB[2], MB[2], MB[3], MB[0], MB[1], MB[1], MB[2], MB[3], MB[0], MB[0], MB[1], MB[2], MB[3]}, where the digits in brackets indicate the byte order.

The control logic generating the sixteen-byte slice of Boolean-masked cipher text input 176 applies Boolean mask 182 in the shifted-row format described above based on the shift operations performed in shift rows step 156. That is, the control logic applies the four discrete bytes of Boolean mask 182 in a shifted-row format that will be realigned when passed through AES-compliant shift rows logic, such as the logic performed at shift rows step 156. First, decryption engine 4 passes Boolean-masked cipher text 176 and decryption round key 178 through add round key step 154, thereby mingling Boolean-masked cipher text 176 (with masking applied in the shifted-rows format of this disclosure) with decryption round key 178 for the current round.

In turn, decryption engine 4 passes the key-mingled cipher text (with the Boolean mask applied in the shifted-row format of this disclosure) through shift rows step 156. As described above, control logic implemented by processor(s) 48 or 78 apply Boolean mask 182 in the shifted-row format of this disclosure such that the execution of shift rows step 156 realigns the (key-mingled version of) Boolean-masked cipher text 176 in most significant to least significant byte order. As shown in FIG. 11, each four-byte segment of the key-mingled version of Boolean-masked cipher text 176 is masked with four instances of a single byte of the four-bytes of Boolean mask 182. AES-compliant shifting logic of shift rows step 156 produces, in most significant to least significant order, key mingled versions of the following segments of Boolean-masked cipher text 176: $X_3+4\{M_B[3]\}$, $X_2+4\{M_B[2]\}$, $X_1+4\{M_B[1]\}$, and $X_0+4\{M_B[0]\}$, where 'X' denotes a respective unmasked cipher text word, and '$M_B$' represents a byte (identified by the byte order number in brackets) of Boolean mask 182.

Decryption engine 4 applies multiplicative mask 184 to the realigned and key-mingled version of Boolean-masked cipher text 176 output by shift rows step 156 using multiplier units positioned immediately downstream of shift rows step 156. Additionally, decryption engine 4 forms two hybrid masks, in accordance with aspects of this disclosure, one by multiplying Boolean mask 182 by multiplicative mask 184, and the other by multiplying Boolean mask 182 by the inverse of multiplicative mask 184. Decryption engine 4 applies mask translation logic 170 by adding the product of multiplicative mask 184 and Boolean mask 182 to the multiplicatively masked version of the realigned and key-mingled version of Boolean-masked cipher text 176. In this way, decryption engine 4 produces a multiplicatively masked version of the realigned and key-mingled version of Boolean-masked cipher text 176 by applying mask translation logic 170 without exposing unmasked words X of Boolean-masked cipher text 176.

Decryption engine 4 pipelines the multiplicatively masked cipher text into respective instances of mask-switching inverse Sbox logic 172 of this disclosure. The mask-switching input to mask-switching inverse Sbox logic 172 is the product of Boolean mask 182 and the inverse of multiplicative mask 184. As described above with respect to FIG. 9, mask-switching inverse Sbox logic 172 seamlessly switches the intermediate data during inverse Sbox operations from being multiplicative to Boolean. In this way, mask-switching inverse Sbox logic 172 produces an AES-compliant inverse Sbox output, with Boolean mask 182 applied. Again, mask-switching inverse Sbox logic 172 switches the cipher text from multiplicatively masked format to Boolean masked format without exposing the cipher text in unmasked form at any time. The underlying logic of mask-switching inverse Sbox logic 172 is described above with respect to FIG. 9, and is not repeated with respect to FIG. 11 for the sake of brevity.

In turn, decryption engine 4 pipelines the outputs of four instances of mask-switching inverse Sbox logic 172 into mask-aligning mix columns logic 174. As described above with respect to FIG. 10, mask-aligning mix columns logic 174 selectively applies multiplier logic with individually selected multiplier factors to individual bytes of input data to create an odd number of iterations (seven in this example) that the Boolean mask is added. By setting the number of mask addition iterations to an odd number, mask-aligning mix columns logic 174 outputs an aligned byte sequence in accordance with AES decryption, with the Boolean mask added.

Decryption engine 4 is implemented using a full round hardware, and hybrid-masked decryption datapath 180 therefore pipelines the same amount of data (sixteen bytes) as AES round datapath 150 of FIG. 5. The overall output (in Boolean-masked form) of four instances of mask-aligning mix columns logic 174 is represented in FIG. 11 as Boolean-masked decrypted output 186. Represented by the symbol $O_M$, Boolean-masked decrypted output 186 is expressed as follows: $O_M$=O[15]+A.M$_B$[3], O[14]+A.M$_B$[0], O[13]+A.M$_B$[1], O[12]+A.M$_B$[2], O[11]+A.M$_B$[2], O[10]+A.M$_B$[3], O[9]+A.M$_B$[0], O[8]+A.M$_B$[1], O[7]+A.M$_B$[1], O[6]+A.M$_B$[2], O[5]+A.M$_B$[3], O[4]+A.M$_B$[0], O[3]+A.M$_B$[0], O[2]+A.M$_B$[1], O[1]+A.M$_B$[2], O[0]+A.M$_B$[3]. As shown by this expression, the overall data stream represented by Boolean-masked decrypted output 186 represents raw data with Boolean mask 182 applied in shifted-row format (matching the masking format of Boolean-masked cipher text input 176).

The control logic implemented by the security processor of processor(s) 48 or 78) may modify multiplicative mask 184 to form a modified multiplicative mask 184' to be used for the next round of hybrid-masked decryption according to hybrid-masked decryption datapath 180. The control logic implemented by the security processor of processor(s) 48 or 78) may also modify Boolean mask 182 for use in future decryption rounds according to hybrid-masked decryption datapath 180. In this way, the hybrid masking techniques of this disclosure add a further layer of security by introducing mask diversity from round to round, thereby decorrelating power trace signatures output during different rounds of encryption/decryption.

As shown in FIG. 11 and described above, decryption engine 4 executes hybrid-masked decryption datapath 180 to decorrelate power trace signatures output by HMD 12, peripheral device 42, etc., thereby improving resistance to SCAs, such as CPA 160. Decryption engine 4 maintains masked status (whether Boolean or multiplicative) of all ingress, intermediate, and egress data at all times during the execution of hybrid-masked decryption datapath 180, and thereby never exposes unmasked data that would otherwise correlate to accurate power trace information that SCA analyzer 8 could otherwise use to carry out CPA 160. Encryption engine 2 may apply the hybrid masking scheme described with respect to FIG. 11 in a corresponding encryption pipeline to conceal all unmasked data that would otherwise correlate to accurate power trace information that SCA analyzer 6 could otherwise use to carry out CPA 160.

Figure 12:
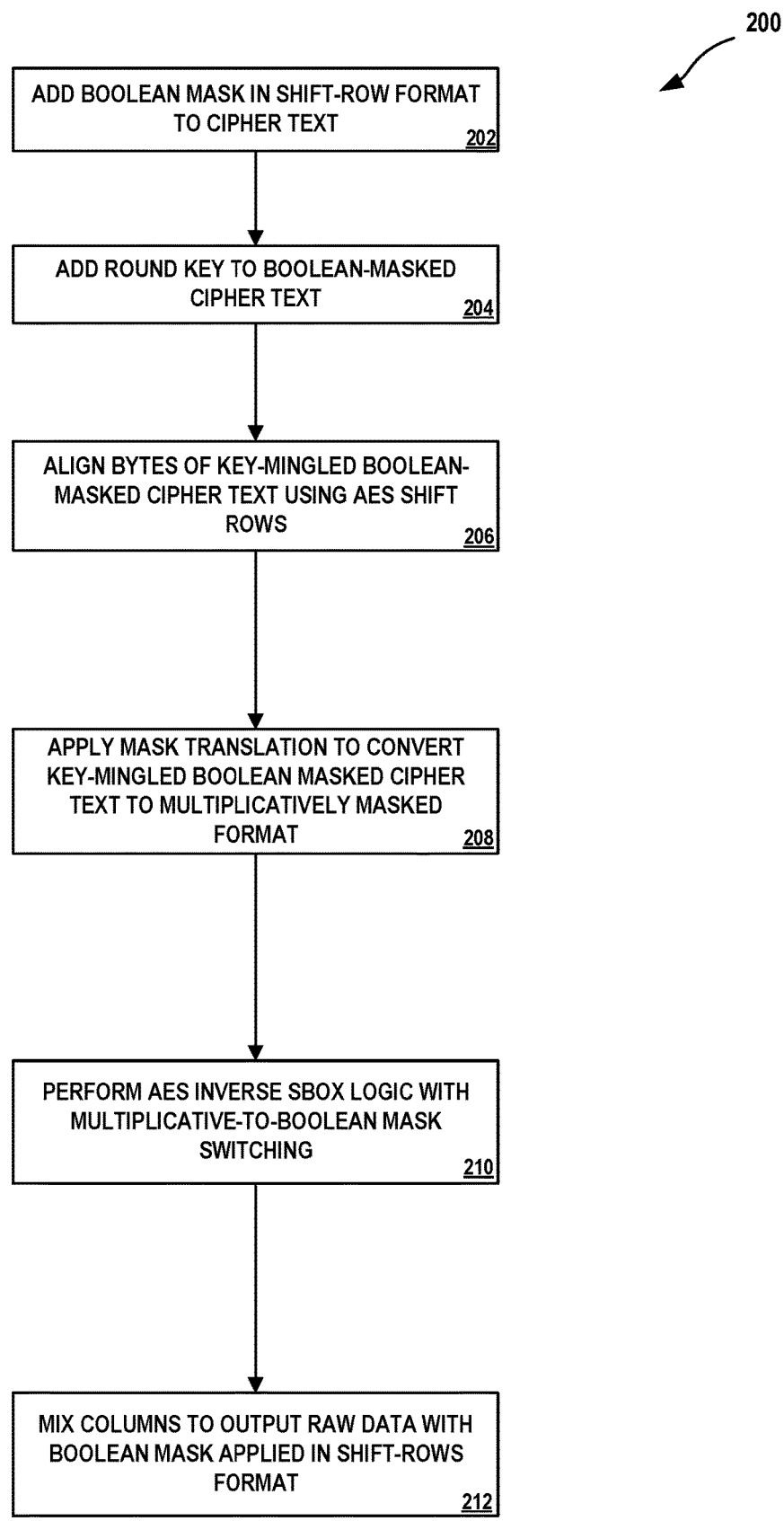
FIG. 12 is a flowchart illustrating an example process that an encryption engine and/or decryption engine of this disclosure may perform to thwart side channel attacks (SCAs) using the hybrid masking techniques of this disclosure.

FIG. 12 is a flowchart illustrating an example process 200 that decryption engine 4 may perform to thwart SCAs using the hybrid masking techniques of this disclosure. Process 200 is described as being performed by decryption engine 4 for ease of discussion, although it will be appreciated that encryption engine 2 may also apply the hybrid masking scheme of this disclosure in the context of an encryption pipeline applied to encrypt raw input data. A security processor of processor(s) 48 or 78 may apply Boolean mask 182 to cipher text in the shifted-row format described above to form Boolean-masked cipher text 176 (202). Decryption engine 4 may add round key 178 of the current round to Boolean-masked cipher text 176 as part of add round key step 154 (204). In turn, decryption engine 4 may align the bytes of key-mingled version of Boolean-masked cipher text 176 using the AES-compliant shift rows step 156 (206).

Decryption engine 4 may apply mask translation logic 170 to convert the key-mingled version of Boolean-masked cipher text 176 to multiplicatively masked format (208). In turn, decryption engine 4 may pipeline the multiplicatively masked intermediate data to mask-switching inverse Sbox logic 172. Mask-switching inverse Sbox logic 172 may perform AES-compliant inverse Sbox operations with the seamless multiplicative-to-Boolean mask switching techniques of this disclosure (210). In this way, mask-switching inverse Sbox logic 172 produces a Boolean-masked output.

Decryption engine 4 pipelines the Boolean-masked output of mask-switching inverse Sbox logic 172 into mask-aligning mix columns logic 174. Mask-aligning mix columns logic 174 outputs raw (decrypted) data with Boolean mask 182 applied in the shift-rows format of this disclosure (212). In this way, decryption engine 4 co-optimizes two types of masking that are suited to different computational stages of AES round datapath 150, with data being fed into and exiting decryption engine 4 in Boolean masked form, with the Boolean mask applied in shifted-row format. Internally, the multiplicative mask replaces the Boolean mask prior to Sbox operations, and the Boolean mask replaces the multiplicative mask before the mix columns computational stage. The Boolean mask that can be used to recover the actual output is also supplied for later recovery of the unmasked output.

As described above, instead of using a 128-bit mask, the security processor of processor(s) 48 or 78 apply a 32-bit mask (for both Boolean and multiplicative masking) to reduce the masking overhead required for the hybrid masking scheme of this disclosure. The 32-bit random masks provide four billion options for each of the masks, providing a high degree of randomness. The Boolean mask is applied in shifted-row format to the unmasked ingress data, further facilitating the seamless replacement performed by mask translation logic 170. The mask-aligning mix-columns operations of this disclosure modify the Boolean mask to the shifted-row format of this disclosure. At all mask-switching junctures of Note that the new mask is first added prior to removing the old mask. Throughout hybrid-masked decryption datapath 180, unmasked intermediate data is never exposed, thereby maintaining decorrelation between the power trace signature and the actual data being decrypted.

The Boolean mask is transformed into a new mask (denoted by $A.M_B$ in FIG. 11) that is passed onto the next round. The multiplicative mask is internally used within the round, and can be independently modified as well (as in the example of FIG. 11). As such, each AES round applies different masks, though the security processor need only provide the Boolean and multiplicative masks for the initial round.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A system on a chip (SoC) comprising:
   a security processor comprising first processing circuitry configured to:
   form a Boolean mask,
   perform a shift operation on the Boolean mask to obtain a shifted-row Boolean mask, and
   add the shifted-row Boolean mask to cipher text to form Boolean-masked cipher text; and
   a decryption engine comprising second processing circuitry configured to:
   apply a shift rows operation to the Boolean-masked cipher text to form byte-aligned Boolean-masked cipher text,
   apply a product of the Boolean mask and a multiplicative mask to the byte-aligned Boolean-masked cipher text to form multiplicatively masked cipher text,
   perform an inverse byte substitution operation on the multiplicatively masked cipher text at least in part by applying a product of the Boolean mask and an inverse of the multiplicative mask to the multiplicatively masked cipher text to form Boolean-masked intermediate data, and
   apply mix columns logic to the Boolean-masked intermediate data to form byte-shifted Boolean-masked output data.

2. The SoC of claim 1, wherein the security processor is further configured to modify the multiplicative mask to form a modified multiplicative mask for a subsequent decryption round.

3. The SoC of claim 1, wherein the security processor is further configured to:
   generate the Boolean mask as a first random number; and
   generate the multiplicative mask as a second random number.

4. The SoC of claim 1, wherein the decryption engine is further configured to add a round key to the Boolean-masked cipher text to form key-mingled Boolean-masked cipher text, and wherein to apply the shift rows operation to the Boolean-masked cipher text, the decryption engine is configured to apply the shift rows operation to the key-mingled Boolean-masked cipher text.

5. The SoC of claim 1, wherein the SoC is configured to support an artificial reality application.

6. The SoC of claim 1, wherein the SoC is integrated into a head-mounted device (HMD).

7. The SoC of claim 1, wherein the SoC is integrated into a peripheral device that is communicatively coupled to a head-mounted device (HMD).

8. A system on a chip (SoC) comprising:
a security processor comprising first processing circuitry configured to:
  form a Boolean mask,
  perform a shift operation on the Boolean mask to obtain a shifted-row Boolean mask, and
  add the shifted-row Boolean mask to input data to form Boolean-masked input data; and
an encryption engine comprising second processing circuitry configured to:
  apply a shift rows operation to the Boolean-masked input data to form byte-aligned Boolean-masked input data,
  apply a product of the Boolean mask and a multiplicative mask to the byte-aligned Boolean-masked input data to form multiplicatively masked input data,
  perform a byte substitution operation on the multiplicatively masked input data at least in part by applying a product of the Boolean mask and an inverse of the multiplicative mask to the multiplicatively masked input data to form Boolean-masked intermediate data, and
  apply mix columns logic to the Boolean-masked intermediate data to form byte-shifted Boolean-masked cipher text.

9. The SoC of claim 8, wherein the security processor is further configured to modify the multiplicative mask to form a modified multiplicative mask for a subsequent encryption round.

10. The SoC of claim 8, wherein the security processor is further configured to:
  generate the Boolean mask as a first random number; and
  generate the multiplicative mask as a second random number.

11. The SoC of claim 8, wherein the encryption engine is further configured to add a round key to the Boolean-masked input data to form key-mingled Boolean-masked input data, and wherein to apply the shift rows operation to the Boolean-masked input data, the encryption engine is configured to apply the shift rows operation to the key-mingled Boolean-masked input data.

12. The SoC of claim 8, wherein the SoC is configured to support an artificial reality application.

13. The SoC of claim 8, wherein the SoC is integrated into a head-mounted device (HMD).

14. The SoC of claim 8, wherein the SoC is integrated into a peripheral device that is communicatively coupled to a head-mounted device (HMD).

15. An artificial reality system comprising:
a security processor configured to:
  form a Boolean mask,
  perform a shift operation on the Boolean mask to obtain a shifted-row Boolean mask, and
  add the shifted-row Boolean mask to cipher text to form Boolean-masked cipher text; and
a decryption engine configured to:
  apply a shift rows operation to the Boolean-masked cipher text to form byte-aligned Boolean-masked cipher text,
  apply a product of the Boolean mask and a multiplicative mask to the byte-aligned Boolean-masked cipher text to form multiplicatively masked cipher text,
  perform an inverse byte substitution operation on the multiplicatively masked cipher text at least in part by applying a product of the Boolean mask and an inverse of the multiplicative mask to the multiplicatively masked cipher text to form Boolean-masked intermediate data, and
  apply mix columns logic to the Boolean-masked intermediate data to form byte-shifted Boolean-masked output data; and
a head-mounted device (HMD) configured to output artificial reality content including unmasked decrypted data formed from the byte-shifted Boolean-masked output data.

16. The artificial reality system of claim 15, wherein the security processor is configured to form the unmasked decrypted data by adding the shifted-row Boolean mask to the byte-shifted Boolean-masked output data.

17. The artificial reality system of claim 15, wherein the security processor and the decryption engine are integrated into the HMD.

18. An artificial reality system comprising:
a peripheral device configured to receive input data;
a security processor configured to:
  form a Boolean mask,
  perform a shift operation on the Boolean mask to obtain a shifted-row Boolean mask, and
  add the shifted-row Boolean mask to the input data to form Boolean-masked input data; and
an encryption engine configured to:
  apply a shift rows operation to the Boolean-masked input data to form byte-aligned Boolean-masked input data,
  apply a product of the Boolean mask and a multiplicative mask to the byte-aligned Boolean-masked input data to form multiplicatively masked input data,
  perform a byte substitution operation on the multiplicatively masked input data at least in part by applying a product of the Boolean mask and an inverse of the multiplicative mask to the multiplicatively masked input data to form Boolean-masked intermediate data, and
  apply mix columns logic to the Boolean-masked intermediate data to form byte-shifted Boolean-masked cipher text.

19. The artificial reality system of claim 18, wherein the security processor and the encryption engine are integrated into the peripheral device.

20. The artificial reality system of claim 19, wherein the artificial reality system further comprises a head-mounted device (HMD) that is communicatively coupled to the peripheral device, and wherein the peripheral device is configured to transmit the byte-shifted Boolean-masked cipher text to the HMD.

* * * * *